US012524386B2

(12) United States Patent
Wong et al.

(10) Patent No.: US 12,524,386 B2
(45) Date of Patent: Jan. 13, 2026

(54) ESTIMATING DATA FILE UNION SIZES USING MINHASH

(71) Applicant: EMC IP Holding Company LLC, Hopkinton, MA (US)

(72) Inventors: Tony Tzeming Wong, Apex, NC (US); Smriti Thakkar, San Jose, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 301 days.

(21) Appl. No.: 17/506,302

(22) Filed: Oct. 20, 2021

(65) Prior Publication Data

US 2023/0119183 A1    Apr. 20, 2023

(51) Int. Cl.
*G06F 16/00*    (2019.01)
*G06F 16/11*    (2019.01)
*G06F 16/22*    (2019.01)

(52) U.S. Cl.
CPC ........ *G06F 16/2255* (2019.01); *G06F 16/122* (2019.01)

(58) Field of Classification Search
CPC .... G06F 16/2255; G06F 16/122; G06F 16/35; G06F 16/137; G06F 16/285
USPC ........... 707/758, 803, 822, 999.101, 999.202
See application file for complete search history.

(56) References Cited

U.S. PATENT DOCUMENTS

| | | | |
|---|---|---|---|
| 9,864,658 B1* | 1/2018 | Barcello | G06F 11/1453 |
| 11,449,523 B2* | 9/2022 | Rao | G06F 16/285 |
| 2014/0344195 A1* | 11/2014 | Drew | G06F 16/35 |
| | | | 706/12 |

* cited by examiner

*Primary Examiner* — Md I Uddin
(74) *Attorney, Agent, or Firm* — Dergosits & Noah LLP; Todd A. Noah

(57) ABSTRACT

Identify first file's minimum value from at least value from applying function to first file's segment and value from applying function to first file's second segment. Identify first file's second minimum value from at least value from applying second function to first file's segment and value from applying second function to first file's second segment. Identify second file's minimum value from at least value from applying function to second file's segment and value from applying function to second file's second segment. Identify second file's second minimum value from at least value from applying second function to second file's segment and value from applying second function to second file's second segment. Estimate first and second files' union size based on whether first file's minimum value equals second file's minimum value, whether first file's second minimum value equals second file's second minimum value, first file's size, and second file's size.

17 Claims, 6 Drawing Sheets

| Hash Function 1 | Hash Function 2 | Hash Function 3 | ... | Hash Function 100 |
|---|---|---|---|---|
| \multicolumn{5}{c}{Data File A} | | | | |
| Fingerprint 1 Hash Value = 17,445 | Fingerprint 1 Hash Value = 25,871 | Fingerprint 1 Hash Value = 35,543 | ... | Fingerprint 1 Hash Value = 13,259 |
| Fingerprint 2 Hash Value = 91 | Fingerprint 2 Hash Value = 58,168 | Fingerprint 2 Hash Value = 31,200 | ... | Fingerprint 2 Hash Value = 39,012 |
| Fingerprint 3 Hash Value = 22,074 | Fingerprint 3 Hash Value = 19,864 | Fingerprint 3 Hash Value = 45,954 | ... | Fingerprint 3 Hash Value = 62,276 |
| ... | ... | ... | | ... |
| Fingerprint 400 Hash Value = 9,656 | Fingerprint 400 Hash Value = 8,871 | Fingerprint 400 Hash Value = 6,007 | ... | Fingerprint 400 Hash Value = 48 |
| Function 1 MinHash Value = 91 | Function 2 MinHash Value = 139 | Function 3 MinHash Value = 42 | ... | Function 100 MinHash Value = 48 |
| Data File B | | | | |
| Fingerprint 1 Hash Value = 38,490 | Fingerprint 1 Hash Value = 62,927 | Fingerprint 1 Hash Value = 64,400 | ... | Fingerprint 1 Hash Value = 35,817 |
| Fingerprint 2 Hash Value = 25,654 | Fingerprint 2 Hash Value = 25,628 | Fingerprint 2 Hash Value = 45,461 | ... | Fingerprint 2 Hash Value = 51,336 |
| Fingerprint 3 Hash Value = 20,741 | Fingerprint 3 Hash Value = 64,004 | Fingerprint 3 Hash Value = 13,617 | ... | Fingerprint 3 Hash Value = 58,767 |
| ... | | | | |
| Fingerprint 400 Hash Value = 6,945 | Fingerprint 400 Hash Value = 5,438 | Fingerprint 400 Hash Value = 3,743 | ... | Fingerprint 400 Hash Value = 38,097 |
| Function 1 MinHash Value = 91 | Function 2 MinHash Value = 123 | Function 3 MinHash Value = 57 | ... | Function 100 MinHash Value = 14 |
| Data File C | | | | |
| Fingerprint 1 Hash Value = 33,813 | Fingerprint 1 Hash Value = 43,862 | Fingerprint 1 Hash Value = 30,706 | ... | Fingerprint 1 Hash Value = 18,838 |
| Fingerprint 2 Hash Value = 50,992 | Fingerprint 2 Hash Value = 21,455 | Fingerprint 2 Hash Value = 50,573 | ... | Fingerprint 2 Hash Value = 58,661 |
| Fingerprint 3 Hash Value = 40,831 | Fingerprint 3 Hash Value = 55,619 | Fingerprint 3 Hash Value = 20,862 | ... | Fingerprint 3 Hash Value = 39,630 |
| ... | ... | ... | | ... |
| Fingerprint 400 Hash Value = 26,621 | Fingerprint 400 Hash Value = 32,056 | Fingerprint 400 Hash Value = 63,847 | ... | Fingerprint 400 Hash Value = 61,457 |
| Function 1 MinHash Value = 146 | Function 2 MinHash Value = 25 | Function 3 MinHash Value = 75 | ... | Function 100 MinHash Value = 48 |
| Data Files D- Y | | | | |
| Data File Z | | | | |
| Fingerprint 1 Hash Value = 27,978 | Fingerprint 1 Hash Value = 35,298 | Fingerprint 1 Hash Value = 50,488 | ... | Fingerprint 1 Hash Value = 43,164 |
| Fingerprint 2 Hash Value = 23,344 | Fingerprint 2 Hash Value = 23,500 | Fingerprint 2 Hash Value = 23,301 | ... | Fingerprint 2 Hash Value = 40,166 |
| Fingerprint 3 Hash Value = 53,744 | Fingerprint 3 Hash Value = 26,083 | Fingerprint 3 Hash Value = 55,366 | ... | Fingerprint 3 Hash Value = 20,628 |
| ... | ... | ... | | ... |
| Fingerprint 400 Hash Value = 15,408 | Fingerprint 400 Hash Value = 57,195 | Fingerprint 400 Hash Value = 33,606 | ... | Fingerprint 400 Hash Value = 22,996 |
| Function 1 MinHash Value = 125 | Function 2 MinHash Value = 36 | Function 3 MinHash Value = 104 | ... | Function 100 MinHash Value = 97 |

FIG. 2

ESTIMATING DATA FILE UNION SIZES USING MINHASH

BACKGROUND

A data object may be a set of information that is backed up as a unit. If a software error corrupts a data object, or if erroneous data updates the data object, a data protection administrator may restore the data object to a previous state that does not include the corrupted or erroneous data. A backup/restore application executes a backup operation either occasionally or continuously to enable this restoration, storing a copy of each desired data object state (such as the values of the data object and the embedding of these values in a database's data structures) within dedicated backup files. When the data protection administrator decides to return the data object to a previous state, the data protection administrator specifies the desired previous state by identifying a desired time when the data object was in this state, and then instructs the backup/restore application to execute a restore operation to restore a copy of the corresponding backup file(s) for that state to the data object.

A data storage system may store a data object on a storage array, which may be a disk-based retention system that includes multiple disk drives. Unlike a disk enclosure, a storage array has cache memory and advanced functionality, such as virtualization and Redundant Array of Independent Disks (RAID). A data protection administrator can instruct a backup/restore application to create backups files of data objects and store the backup files of data objects on multiple storage arrays.

Data storage systems include recording media that retain digital information, have evolved towards scalable designs that can grow with customer demand by adding storage and computation as necessary, and generally store redundant information. For example, when creating backup copies of an email system which includes 100 instances of the same 1 Megabyte (MB) file attachment, a data storage system may store all 100 instances of the same 1 MB file attachment, inefficiently using 100 MB of storage space to store the same 1 MB file attachment. Data deduplication can eliminate redundant copies of information, which can improve the utilization of data storage and lower capital expenditure by reducing the total amount of recording media required to meet the capacity needs of data storage. Continuing the previous example, a data deduplication system may store only one instance of the same 1 MB file attachment and efficiently store small references to the one stored instance for the 99 subsequent instances.

When being written to a data storage system, a data object or a data file is typically divided into data segments. A data deduplication system can receive and then process these data segments by comparing these received data segments against previously received and stored data segments, identifying which currently received data segments are unique, and storing the data segments which are currently identified as unique. When a comparison identifies a received data segment as a duplicate of a data segment that has already been stored as unique, a data deduplication system replaces the duplicate data segment with a small reference that points to the stored data segment.

In many data centers and cloud storage environments, multiple data storage customers may share the same data file system provided by a multi-tenant data storage provider. Consequently, such a storage provider needs to be able to compute the total size of a collection of data files stored for each customer to accurately charge each customer for the expenses of storing their data files. In a traditional data file system, the total size of data file A and data file B is simply the sum of their logical sizes, which may be expressed as $|A|+|B|$. Since data files share common data segments in a deduplication file system, the total physical size of data file A and data file B is the union of data file A and data file B minus the intersection of data file A and data file B, which may be expressed as $|A \cup B|=|A|+|B|-|A \cap B|$. Since the content of a data file is chunked into data segments in deduplication file systems, and these data segments are represented by a cryptographic strength hash value, such as a SHA-1 fingerprint, the sizes of the unions of data files are therefore measured by the number of the data files' unique SHA1 fingerprints for the data segments.

Existing techniques to estimate the union size of two data files include a brute force algorithm and a physical capacity reporting algorithm. These algorithms require a one-time step to prepare the required metadata, such as sorting the data files' fingerprints, but this required metadata may be used in all subsequent estimations of union sizes. The complexity is at worst $O(N*\log N)$ where N is the number of fingerprints of the file.

The brute force algorithm, which is the most accurate algorithm to estimate the union size of two data files, counts the data files' data segments, sorts the data files' fingerprints, and counts the number of the data files' unique data segments by counting the number of the data files' unique fingerprints. However, data deduplication systems typically divide data files into segments that are 10 KB (kilo-byte) in size, such that a 1 GB (giga-byte) data file is divided into 1 million segments, and each of these 1 million segments is represented by a unique 20-byte SHA-1 fingerprint. The amount of memory, the central processing unit (CPU) utilization, and the number of input/output operations required for a computer system to sort 1 million 20-byte fingerprints for each data file, individually compare 1 million 20-byte fingerprints for one data file against 1 million 20-byte fingerprints for another data file, and then repeat this process for every possible merging of data files may consume a significantly large amount of system resources. If N is the number of data segments in the data files, a direct comparison by the brute force algorithm has time complexity $O(N^2)$. Even if the fingerprints are sorted and then compared in a linear scan, the time complexity is still expressed as $O(N+N*\log=O(N*\log N)$.

The physical capacity reporting algorithm maps each fingerprint in a data file to a single bit in a specialized bloom filter for the data file, and this bloom filter is sized for the maximum capacity of the file system that supports the data file. To estimate the union size of two data files, the "expected" number of fingerprints can be computed from the number of bits set in the bloom filter using a well-known formula. In a 100 tera-byte (TB) system with the average data segment size of 4 KB (after compression), there are $100*1,024^4/4,096=26,843,545,600$ data segments, and since a suitable load factor for a bloom filter is 6, such that 6 bits are reserved to represent each fingerprint, the size of the bloom filter will be $26,843,545,600*6$ bits/8 bytes=20 GB. Since such a bloom filter can require 20 GB of storage space, data sampling may be used, such as a sampling rate of 1/1,024 to reduce the size of each bloom filter to 20 MB (mega-byte), but such a high sampling rate increases the standard deviation in the union size estimate. The time complexity is $O(C)$, where C is the size of the bloom filter, which is a significantly large constant. Whether the physical capacity reporting algorithm or the brute force algorithm is used to compute the union size of two data files, the algorithm might be repeated thousands times or even millions of times, depending on the number of data segments in the data files.

BRIEF DESCRIPTION OF THE DRAWINGS

FIG. 2 illustrates an example hash values chart for estimating data file union sizes, under an embodiment;

DETAILED DESCRIPTION

Figure 1:
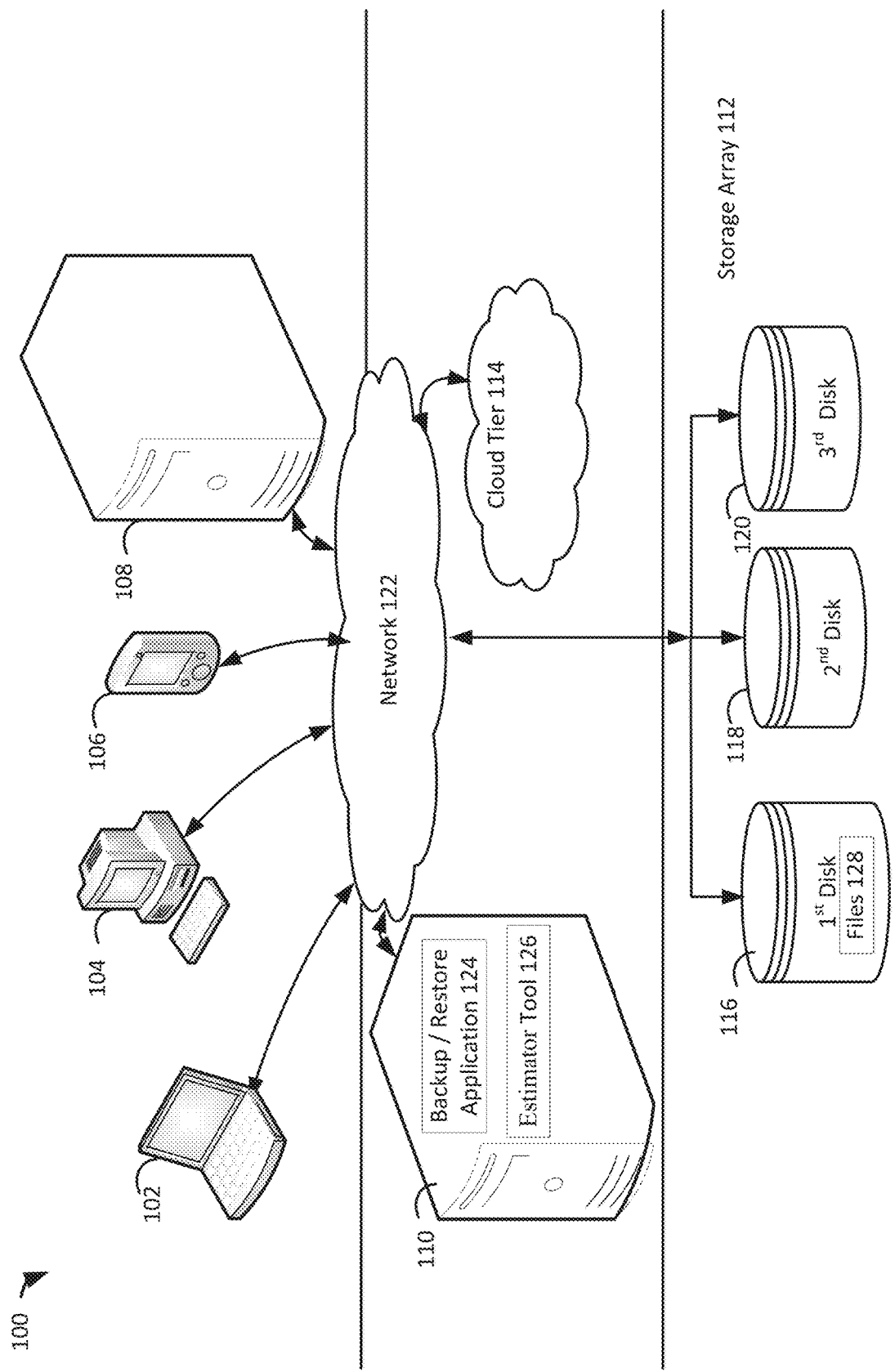
FIG. 1 illustrates a block diagram of an example system for estimating data file union sizes, under an embodiment.

Embodiments of the present disclosure use the MinHash (or the min-wise independent permutations locality sensitive hashing scheme) technique to estimate the union size of two data files. The purpose of the MinHash technique is to efficiently estimate the Jaccard similarity coefficient, which is a commonly used indicator of the similarity between two sets of elements. The MinHash technique's many use cases include identifying documents that are similar to each other as a cluster of documents with similar attributes and identifying which documents are completely similar to each other as duplicate documents which are to be deleted from the cluster.

If U is a set and A and B are subsets of U, then the Jaccard similarity coefficient is defined to be the ratio of the number of elements of their intersection to the number of elements of their union, which may be expressed in the equation for the Jaccard similarity coefficient as: $J(A, B)=|A \cap B|/|A \cup B|$.

The Jaccard similarity coefficient's value equals 0 when the two sets of elements are disjoint, equals 1 when the two sets of elements are equal, and otherwise equals between 0 and 1. Two sets of elements are more similar, such that they have relatively more elements in common, when the value of their Jaccard similarity coefficient is closer to the value of 1 than to the value of 0. The goal of the MinHash technique is to estimate the Jaccard similarity coefficient quickly, without explicitly computing the intersection of the sets of elements and union of the sets of elements.

If h is a hash function that maps the members of the set U to distinct integers, and perm is a random permutation of the elements of the set U, then h min(S) is defined for any set S as the minimal member of S with respect to h○perm— that is, the member x of S with the minimum value of h(perm(x)). In cases where the hash function used is assumed to have pseudo-random properties, the random permutation is not used.

Applying h min to both A and B, and assuming no hash collisions, the values are equal (h min(A)=h min(B)) if and only if among all elements of A ∪ B, the element with the minimum hash value lies in the intersection A ∩ B. The probability of this being true is exactly the Jaccard similarity coefficient, therefore:

$$Pr[h\ min(A)=h\ min(B)]=J(A,B).$$

The probability that h min(A)=h min(B) is true is equal to the Jaccard similarity coefficient $J(A, B)$, assuming drawing perm from a uniform distribution. If r is the random variable that equals 1 when h min(A)=h min(B) and equals 0 otherwise, then r is an unbiased estimator of the Jaccard similarity coefficient $J(A, B)$. Since r is always equal to the value of 0 or 1, r has too high a variance to be a useful estimator for the Jaccard similarity coefficient on its own, the MinHash technique reduces this variance by averaging together several variables constructed in the same way.

The simplest version of the MinHash technique uses k different hash functions, where k is a fixed integer parameter, and represents each set S by the k values of h min(S) for these k functions. In this version of the MinHash technique, y is the number of hash functions for which h min(A)=h min(B), k is the number of hash functions and y same hash values divided by k hash functions is the estimate of Jaccard similarity coefficient $J(A, B)$. This estimate is the average of k different random variables from 0 to 1, each of which equals 1 when h min(A)=h min(B) and equals 0 otherwise, and each of which is an unbiased estimator of the Jaccard similarity coefficient $J(A, B)$.

Therefore, the average of the k different random variables is also an unbiased estimator, converges to a normal distribution, and by standard deviation for sums of random variables from 0 to 1, the expected error is $O(1/\sqrt{k})$. Therefore, for any constant $\varepsilon>0$ there is a constant $k=O(1/\varepsilon^2)$ such that the expected error of the estimate is at most $\varepsilon$. For example, 400 hashes would be required to estimate the Jaccard similarity coefficient $J(A, B)$ with an expected error which is less than or equal to 0.05.

Given files A and B, the Jaccard similarity coefficient is defined as:

$$J(A,B)=|A \cap B|/|A \cup B|$$

$$J(A,B)=(|A|+|B|-|A \cup B|)/|A \cup B|$$

$$J(A,B)*|A \cup B|=(|A|+|B|-|A \cup B|)$$

$$|A \cup B|+[J(A,B)*|A \cup B|]=|A|+|B|$$

$$|A \cup B|*[1+J(A,B)]=|A|+|B|$$

$$|A \cup B|=(|A|+|B|)/[1+J(A,B)]$$

Therefore, the size of the union of two files A and B with MinHash values $M_1$ and $M_2$ may be estimated using the formula:

$$|A \cup B|=(|A|+|B|)/(1+J(A,B)),$$

where $J(A, B)$ is the Jaccard similarity coefficient estimated using the MinHash values: $J(A, B)$=(number of common MinHash values)/(total number of MinHash values)

Since |A| and |B| are known, the MinHash algorithm can use the above formula to estimate the size of the union of the two files A and B, and combine the MinHash values of A and B to form the MinHash technique's representation of |A ∪ B|. If m is the number of MinHash values in $M_A$ and $M_B$, then $M_{A \cup B}$=minimum hashes of $M_A \cup M_B$.

Therefore, the number of MinHash values for a first file which are equal to their corresponding MinHash values for a second file divided by the total number of MinHash values [y{h min(A)=h min(B)}/k] is used as an estimate of the Jaccard similarity coefficient for the two data files. The aggregated number of total fingerprints for the two data files (|A|+|B|) is divided by the sum of one plus the estimate of the Jaccard similarity coefficient (1+J(A, B)) to estimate the number of unique data segments for the union of the two data files. The estimated number of unique data segments is then multiplied by the average size of the data segments to estimate the size of the union of the two data files.

For example, if 100 of 100 MinHash values generated for the 400 fingerprints for file A are the same as their corresponding 100 MinHash values generated for the 400 fingerprints for file B, then the estimate of the Jaccard similarity coefficient for combined files A and B equals the 100 common MinHash values divided by the 100 MinHash functions, which equals 1.0. The aggregated numbers of unique fingerprints for files A and B equals 400 total fingerprints for file A added to the 400 total fingerprints for file B which equals 800 unique fingerprints. The 800 total fingerprints are divided by the sum of 1.0 plus the estimate of the Jaccard similarity coefficient of 1.0, such that 800 divided by (1.0+1.0) equals 800 divided by 2.0, which equals an estimated 400 unique data segments for the union of files A and B. The estimate of 400 unique data segments is then multiplied by the average size of 10 KB per data segment to estimate a size of 4 MB for the union of files A and B.

In another example, if 0 of the 100 MinHash values generated for the 400 fingerprints for file A are the same as their corresponding 100 MinHash values generated for the 400 fingerprints for file B, then the estimate of the Jaccard similarity coefficient for combined files A and B equals 0 common MinHash values divided by 100 MinHash functions, which equals 0.0. The aggregated numbers of fingerprints for files A and B equals 400 total fingerprints for file A added to 400 total fingerprints for file B which equals 800 total fingerprints. The 800 total fingerprints are divided by the sum of 1.0 plus the estimate of the Jaccard similarity coefficient of 0.0, such that 800 divided by (1.0+0.0) equals 800 divided by 1.0, which equals an estimated 800 unique data segments for the union of files A and B. The estimate of 800 unique data segments is then multiplied by the average size of 10 KB per data segment to estimate a size of 8 MB for the union of files A and B.

The MinHash technique's time complexity is $O(M)$, where M is the number of the MinHash technique's entries, which may be a relatively small constant such as 100, which is a significantly smaller time complexity than the time complexity $O(N+N*\log N)=O(N*\log N)$. for the brute force algorithm and the time complexity $O(C)$ with a significantly large constant for the physical capacity reporting algorithm, such as 20 MB as described above. If a system uses the example's scaled-down parameters of 100 2-byte entries for MinHash values for each of 26 data files, then the total storage requirement for MinHash technique's data structures would be 5 KB, which is 100*2*26. Although the MinHash technique can be used to estimate the size of the union of individual data files, in some embodiments applying the MinHash technique may be a more efficient use of system resources when estimating the size of the union of data files that are M-trees, which are similar to a subdirectory of data files. If the system supports a maximum of 256 M-trees and uses 1,024 8-byte entries for MinHash values for each of the 256 M-trees, then the total storage requirement for MinHash technique's data structures would be 2 MB, which is 1,024*8*256. Such a total storage requirement of 2 MB is significantly smaller than the total storage requirement of 5 TB for the 20 GB bloom filters (20 GB*256=5 TB), or 5 GB for the 20 MB bloom filters (20 MB*256=5 GB) required for the M-trees in the physical capacity reporting algorithm described above.

Embodiments herein enable estimating data file union sizes. A system identifies a first file's first minimum value from at least a hash value generated by applying a first hash function to the first file's first segment identifier and a hash value generated by applying the first hash function to the first file's second segment identifier. The system identifies the first file's second minimum value from at least a hash value generated by applying a second hash function to the first file's first segment identifier and a hash value generated by applying the second hash function to the first file's second segment identifier. The system identifies a second file's first minimum value from at least a hash value generated by applying the first hash function to the second file's first segment identifier and a hash value generated by applying the first hash function to the second file's second segment identifier. The system identifies the second file's second minimum value from at least a hash value generated by applying the second hash function to the second file's first segment identifier and a hash value generated by applying the second hash function to the second file's second segment identifier. The system estimates a size of a union of the first and second files based on whether the first file's first minimum value equals the second file's first minimum value, whether the first file's second minimum value equals the second file's second minimum value, the first file's size, and the second file's size.

For example, an estimator tool identifies hash function 1's final minimum value of 91 as the MinHash value of hash function 1 for file A, after applying hash function 1 to generate hash function 1's hash values for all of file A's 400 fingerprints, which includes applying hash function 1 to file A's fingerprint 1 to generate the hash value of 17,445 and applying hash function 1 to file A's fingerprint 2 to generate the hash value of 91. The estimator tool identifies hash function 2's final minimum value of 139 as the MinHash value of hash function 2 for file A, after applying hash function 2 to generate hash function 2's hash values for all of file A's 400 fingerprints, which includes applying hash function 2 to file A's fingerprint 1 to generate the hash value of 25,871 and applying hash function 2 to file A's fingerprint 2 to generate the hash value of 58,168. The estimator tool identifies hash function 1's final minimum value of 91 as the MinHash value of hash function 1 for file B, after applying hash function 1 to generate hash function 1's hash values for all of file B's 400 fingerprints, which includes applying hash function 1 to file B's fingerprint 1 to generate the hash value of 38,490 and applying hash function 1 to file A's fingerprint 2 to generate the hash value of 25,654. The estimator tool identifies hash function 2's final minimum value of 123 as the MinHash value of hash function 2 for file B, after applying hash function 2 to generate hash function 2's hash values for all of file B's 400 fingerprints, which includes applying hash function 2 to file B's fingerprint 1 to generate the hash value of 62,927 and applying hash function 2 to file B's fingerprint 2 to generate the hash value of 25,628.

Then the estimator tool determines that 60 of the 100 MinHash values generated for the 400 fingerprints for file A are the same as their corresponding 60 of the 100 MinHash values generated for the 400 fingerprints for file B, then estimating the Jaccard similarity coefficient as equal to 60 common MinHash values divided by 100 total MinHash functions which equals 0.6. The estimator tool determines that the aggregated numbers of fingerprints for files A and B is equal to 400 total fingerprints for file A plus 400 total fingerprints for file B, which equals 800 total fingerprints, which represent 800 data segments. The estimator tool adds the 4 MB size of file A to the 4 MB size of file B to total a maximum 8 MB size for the union of files A and B, and divides this 8 MB size by the 800 data segments to identify an average segment size of 10 KB. The estimator tool divides the 800 total fingerprints by the sum of 1.0 plus the estimate of the Jaccard similarity coefficient of 0.6, which is 800 divided by (1.0+0.6), or 800 divided by 1.6, which equals an estimated 500 unique data segments for the union of files A and B. The estimator tool multiplies the estimate of 500 unique data segments by the average size of 10 KB per data segment to estimate a size of 5 MB for the union of files A and B.

FIG. 1 illustrates a diagram of a system 100 for estimating data file union sizes, under an embodiment. As shown in FIG. 1, the system 100 may illustrate a cloud computing environment in which data, applications, services, and other application resources are stored and delivered through shared data centers and appear as a single point of access for the users. The system 100 may also represent any other type of distributed computer network environment in which servers control the storage and distribution of application resources and services for different client users.

In an embodiment, the system 100 represents a cloud computing system that includes a first client 102, a second client 104, a third client 106, and a fourth client 108, and a server 110, a storage array 112, and a cloud tier 114 that may be provided by a hosting company. The storage array 112 may include a first disk 116, a second disk 118, and a third disk 120. The clients 102-108, the server 110, the storage array 112, and the cloud tier 114 communicate via a network 122.

Although FIG. 1 depicts the first client 102 as a laptop computer 102, the second client 104 as a personal computer 104, the third client 106 as a smartphone 106, and the fourth client 108 as a server 108, each of the clients 102-108 may be any type of computer. Even though FIG. 1 depicts the system 100 with four clients 102-108, one server 110, one storage array 112, one cloud tier 114, three disks 116-120, and one network 122, the system 100 may include any number of clients 102-108 any number of servers 110, any number of storage arrays 112, any number of cloud tiers 114, any number of disks 116-120, and any number of networks 122. The clients 102-108 and the server 110 may each be substantially like the system 500 depicted in FIG. 5 and described below.

The server 110, which may be referred to as a backup server 110, includes a backup/restore application 124 that can create backup files of data objects for the clients 102-108, and execute a restore based on the backup files stored on the storage array 112 and/or the cloud tier 114. The backup/restore application 124 can provide centralized administration, such as scheduling, monitoring, and managing backup operations and backup files. The backup/restore application 124 can enable the storing of backup operation schedules, client policies, and client configurations. The backup/restore application 124 can provide a unique interface to the clients 102-108 during login, and assist the backup server 110 in authenticating and registering the clients 102-108.

The backup/restore application 124 can send backup/restore work orders to the clients 102-108, which can receive and process the work orders to start a backup or restore operation. The backup/restore application 124 can maintain a local database of all processes that execute on the backup server 110. The backup/restore application 124 can execute server-side processes for a system administrator's graphical management console, which may enable the system administrator to use command line interface tools for queries. For example, a system administrator identifies the clients 102-108 registered with the backup server 110.

The backup server 110 also includes an estimator tool 126, which can estimate the sizes of unions of data files 128 that may be stored on the first disc 116. Although FIG. 1 depicts one estimator tool 126 residing completely on the backup server 110 and one set of files 128 residing completely on the first disc 116, any number of the estimator tool 126 and any number of the sets of files 128 may reside in any combination of partially or completely on the backup server 110, on another server which is not depicted in FIG. 1, on the cloud tier 114, on the discs 116-120, and on the clients 102-108.

Although the following paragraphs describe Dell Corporation's PowerProtect® backup/restore application, Dell Corporation's NetWorker® backup/restore application, and Dell Corporation's Avamar® backup/restore application as examples of the backup/restore application 124, the backup/restore application 124 may be any other type of backup/restore application which provides the backup/restore functionalities described in the Background section. The backup server 110 may be any other type of backup server which provides the backup/restore functionalities described in the Background section.

The backup/restore application 124 may be a Dell Corporation's PowerProtect® Data Manager backup/restore application, which supports Microsoft SQL/Exchange/DB2/Oracle/SAP Oracle/SAP HANA/Filesystem/Hadoop and ProtectPoint solutions, as well as Kubernetes containers and virtual environments. Providing more than just access to backups and restore capabilities, PowerProtect® Data Manager provides analytics and reuse for development/testing, leverages the cloud to extend data center capabilities, and protects cloud native applications. PowerProtect® Data Manager's automated orchestration of fail-over, failback, and testing simplifies production disaster recovery scenarios. PowerProtect® Data Manager empowers data and application owners to perform self-service backup and restore operations from native applications directly to Dell protection storage appliances.

When superior performance is crucial, PowerProtect® Data Manager provides a direct path between Dell tier 1 storage and PowerProtect® Data Domain and/or Data Domain. PowerProtect® Data Manager extends protection to the cloud by tiering backups to cloud storage for long-term retention, thereby maximizing retention and access to backups without impacting on-premises protection storage resources. When tiering is not enough, PowerProtect® Data Manager enables disaster recovery to the public cloud. At the same time, PowerProtect® Data Manager's governance control provides IT with the necessary oversight and governance to ensure compliance, making even the strictest service level objectives obtainable.

The backup/restore application 124 may be a Dell Corporation's NetWorker® backup/restore application, which is a suite of enterprise level data protection software that unifies and automates backup to tape, disk-based, and flash-based storage media across physical and virtual environments for granular and disaster recovery. Cross-platform support is provided for many environments, including Microsoft® Windows®. A central NetWorker® server manages a data zone that contains backup clients and NetWorker® storage nodes that access the backup media. The NetWorker® management console software provides a graphic user interface for functions such as client configuration, policy settings, schedules, monitoring, reports, and daily operations for deduplicated and non-deduplicated backups.

The core NetWorker® software backs up client file systems and operating system environments. Add-on database and application modules provide backup services for products such as Microsoft® Exchange Server. Client backup data may be sent to a remote NetWorker® storage node or stored on a locally attached device using a dedicated storage node. Dell Corporation's NetWorker® modules for Microsoft® applications supports Microsoft® products such as Microsoft® Exchange, Microsoft® Sharepoint, Microsoft® SQL Server, and Microsoft® Hyper-V servers.

The backup/restore application 124 may be Dell Corporation's Avamar® backup/restore application, which provides fast, efficient backup and recovery through a complete software and hardware solution. Equipped with integrated variable-length deduplication technology, Dell Corporation's Avamar® backup/restore application facilitates fast, periodic full backups for virtual environments, remote offices, enterprise applications, network access servers, and desktops/laptops. Data deduplication significantly reduces backup time by only storing unique periodic changes, while always maintaining periodic full backups for an immediate single step restore. The transmission of deduplicated backup sends only changed blocks, reducing network traffic.

Dell Corporation's Avamar® backup/restore application leverages existing local area network and wide area network bandwidth for enterprise-wide and remote/branch office backup and recovery. Every backup is a full backup, which makes it easy for users to browse, point, and click for a single-step recovery. Dell Corporation's Avamar® data store features redundant power and networking, redundant array of independent disks, and redundant array of inexpensive nodes technology to provide uninterrupted data accessibility.

Periodic checks of data systems ensure recoverability whenever needed. Dell Corporation's Avamar® systems may be deployed in an integrated solution with Dell Corporation's Data Domain® systems for high-speed backup and recovery of specific data types. The storage array 112 may be a Dell Corporation's Powermax, a Dell Corporation XIO, or a Dell Corporation Unity storage array.

The system 100 may include different policies for various data protection levels, such as a "gold" policy for VMware® clients, a "platinum" policy for UNIX® clients, and a "silver" policy for Windows® clients. The gold policy can specify to store 2 backup copies for each VMware® client's application resources onto the first disk 116 for 6 months, store a primary clone of the backup copies onto the second disk 118 for 1 year, and store a secondary clone of the backup copies onto a tape, which is not depicted in FIG. 1, for 5 years. In another example, a policy can provide redundancy by specifying to replicate each full backup copy to three different backups servers, replicate each incremental cumulative backup copy and each incremental differential backup copy to two different backup servers, replicate each archive log backup copy to one additional backup server, and relocate each full backup copy created at the end of the month to cloud tiering 114 for long term retention. Backup copies stored in the cloud tiering 114 have higher costs associated with storing and accessing the data in the backup copies. A policy's start time can specify the start times for creating a backup copy of an application resource, such as 12:00, 13:00, 14:00, and 15:00, for an hourly backup copy, a policy's retention policy can specify the length of time that a backup copy is retained before the backup copy is destroyed, such as a week, a month, or a year, and a policy's destination pool can specifies the target storage device where backup copies are stored, such as the first disk 116, the second disk 118, the third disk 120, and/or cloud-tiering 114.

FIG. 2 illustrates an example hash values chart 200 for estimating data file union sizes, under an embodiment. In a production environment, the estimator tool 126 can apply 1,024 hash functions to generate 8-byte hash values for each of 1,000,000 20-byte fingerprints which represent 1,000,000 data segments for each of 256 data files. Using the example scaled-down parameters, the estimator tool 126 applies 100 hash functions to generate 2-byte hash values for each of 400 20-byte fingerprints which represent 400 data segments for each of 26 data files.

Even using the example scaled-down parameters, the process of applying 100 hash functions to generate 2-byte hash values for each of 400 20-byte fingerprints which represent 400 data segments for each of 26 data files requires generating 1.3 million random values that each range from 0 to 65,535, and then making 1.3 million comparisons of these random values, which is a process that is impossible to be performed in the mind of a human. Since the value of a typical 20-byte fingerprint is a random number that ranges from 0 to $1.461*10^{48}$, simply applying a hash function to such a fingerprint is a process than is impossible to be performed in the mind of a human. Even after using scaled-down parameters, most columns and most rows of hash values are omitted from FIG. 2 for purposes of space, clarity, and readability. For example, the hash values chart 200 depicts only hash function 1, hash function 2, hash function 3, and hash function 100 of the 100 hash functions which generate hash values, depicted only for fingerprint 1, fingerprint 2, fingerprint 3, and fingerprint 400 of the 400 fingerprints, depicted in only data file A, data file B, data file C, and data file Z of the 26 data files.

In the example depicted by the hash values chart 200, the MinHash technique begins with the estimator tool 126 applying hash function 1 to file A's fingerprint 1, which is a 20-byte SHA-1 fingerprint created by hashing file A's data segment 1, to generate the hash value of 17,445. Although the hash values chart 200 depicts two-byte hash values that range from 0 to 65,535, a production environment's eight-byte hash value is a random number that ranges from 0 to $18.438*10^{18}$. Similarly, the estimator tool 126 applies hash function 1 to file A's fingerprint 2, which is a 20-byte SHA-1 fingerprint created by hashing file A's data segment 2, to generate the hash value of 91.

Likewise, the estimator tool 126 applies hash function 1 to file A's fingerprint 3, which is a 20-byte SHA-1 fingerprint created by hashing file A's data segment 3, to generate the hash value of 22,074. The estimator tool 126 continues applying hash function 1 to file A's fingerprints numbered 4 to 400 to generate hash values numbered 4 to 400. Although hash function 1's hash values numbered 4 to 399 are not depicted for file A, the hash values chart 200 does depict hash function 1's hash value 400 for file A, which is 9,656.

During the process of applying hash function 1 to file A's 400 fingerprints to generate hash function 1's 400 hash values, the size estimator 126 continuously tracks the minimum value of hash function 1's 400 hash values to determine file A's MinHash for hash function 1. For example, after applying hash function 1 to file A's fingerprint 1 to generate the hash value of 17,445, the estimator tool 126 identifies the minimum value of hash function 1's hash values generated for file A is 17,445 which is hash function 1's only hash value generated for file A at that time. After applying hash function 1 to file A's fingerprint 2 to generate the hash value of 91, the estimator tool 126 identifies the minimum value of hash function 1's hash values generated for file A is 91, which is the minimum value of hash function 1's most recent hash value of 91 and the previous minimum of hash function 1's hash values, which is 17,445. After applying hash function 1 to file A's fingerprint 3 to generate the hash value of 22,074, the estimator tool 126 identifies the minimum value of hash function 1's hash values generated for file A is still 91, which is the minimum value of hash function 1's most recent hash value of 22,074 and hash function 1's previous minimum hash value, which is 91.

The estimator tool 126 continues identifying the minimum value of hash function 1's hash values generated for file A while applying hash function 1 to file A's fingerprints numbered 4 to 400 to generate hash function 1's hash values numbered 4 to 400. After applying hash function 1 to file A's fingerprint 400 to generate the hash value of 9,656, the estimator tool 126 identifies the minimum value of hash function 1's hash values generated for file A is still 91, which is the minimum value of hash function 1's most recent hash value of 9,656, and hash function 1's previous minimum hash value, which is 91. Having used hash function 1 to generate hash function 1's hash values for all of file A's 400 fingerprints, the estimator tool 126 identifies hash function 1's final minimum value of 91 as the MinHash value of hash function 1 for file A.

In addition to applying hash function 1 to file A's 400 fingerprints to generate hash function 1's 400 hash values, the estimator tool 126 applies hash function 2 to file A's 400 fingerprints, including file A's fingerprint 1, which is a 20-byte SHA-1 fingerprint created by hashing file A's data segment 1, to generate the hash value of 25,871. Similarly, the estimator tool 126 applies hash function 2 to file A's fingerprint 2 to generate the hash value of 58,168. Likewise, the estimator tool 126 applies hash function 2 to file A's fingerprint 3 to generate the hash value of 19,864. The estimator tool 126 continues applying hash function 2 to file A's fingerprints numbered 4 to 400 to generate hash function 2's hash values numbered 4 to 400. Although hash function 2's hash values numbered 4 to 399 for file A are not depicted, the hash values chart 200 does depict hash function 2's hash value 400 for file A, which is 8,871.

During the process of applying hash function 2 to file A's 400 fingerprints to generate hash function 2's 400 hash values, the size estimator 126 continuously tracks the minimum value of hash function 2's 400 hash values to determine file A's MinHash for hash function 2. For example, after applying hash function 2 to file A's fingerprint 1 to generate the hash value of 25,871, the estimator tool 126 identifies the minimum value of hash function 2's hash values generated for file A is 25,871 which is hash function 2's only hash value generated for file A at that time. After applying hash function 2 to file A's fingerprint 2 to generate a hash value of 58,168, the estimator tool 126 identifies the minimum value of hash function 2's hash values generated for file A is 25,871, which is the minimum value of hash function 2's most recent hash value of 58,168, and hash function 2's previous minimum hash value, which is 25,871. After applying hash function 2 to file A's fingerprint 3 to generate a hash value of 19,864, the estimator tool 126 identifies the minimum value of hash function 2's hash values generated for file A is now 19,864, which is the minimum value of hash function 2's most recent hash value of 19,864 and hash function 2's previous minimum hash value, which is 25,871.

The estimator tool 126 continues identifying the minimum value of hash function 2's hash values generated for file A while applying hash function 2 to file A's fingerprints numbered 4 to 400 to generate hash function 2's hash values numbered 4 to 400. After applying hash function 2 to file A's fingerprint 400 to generate a hash value of 8,871, the estimator tool 126 identifies the minimum value of hash function 2's hash values generated for file A is 139, which is the minimum value of hash function 2's most recent hash value of 8,871, and hash function 2's previous minimum hash value, which is 139. Having used hash function 2 to generate hash values for all of file A's 400 fingerprints, the estimator tool 126 identifies hash function 2's final minimum value of 139 as the MinHash value of hash function 2 for file A.

In addition to applying hash function 1 to file A's 400 fingerprints to generate hash function 1's 400 hash values, and applying hash function 2 to file A's 400 fingerprints to generate hash function 2's 400 hash values, the estimator tool 126 applies hash functions numbered 3 to 100 to file A's 400 fingerprints, although the hash value chart 200 only depicts the hash values generated by hash function 3 and hash function 100. Similar to the application of hash functions 1 and 2, the estimator tool 126 applies hash function 3 to file A's fingerprint 1 to generate the hash value of 35,543, to file A's fingerprint 2 to generate the hash value of 31,200, and to file A's fingerprint 3 to generate the hash value of 45,954. The estimator tool 126 continues applying hash function 3 to file A's fingerprints numbered 4 to 400 to generate hash function 3's hash values numbered 4 to 400. Although hash function 3's hash values numbered 4 to 399 for file A are not depicted, the hash values chart 200 does depict hash function 3's hash value 400 for file A, which is 6,007.

During the process of applying hash function 3 to file A's 400 fingerprints to generate hash function 3's 400 hash values, the size estimator 126 continuously tracks the minimum value of hash function 3's 400 hash values to determine file A's MinHash for hash function 3. For example, after applying hash function 3 to file A's fingerprint 1 to generate the hash value of 35,543, the estimator tool 126 identifies the minimum value of hash function 3's hash values generated for file A is 35,543. After applying hash function 3 to file A's fingerprint 2 to generate a hash value of 31,200, the estimator tool 126 identifies the minimum value of hash function 3's hash values generated for file A is now 31,200. After applying hash function 3 to file A's fingerprint 3 to generate a hash value of 45,954, the estimator tool 126 identifies the minimum value of hash function 3's hash values generated for file A is still 31,200.

The estimator tool 126 continues identifying the minimum value of hash function 3's hash values generated for file A while applying hash function 3 to file A's fingerprints numbered 4 to 400 to generate hash function 3's hash values numbered 4 to 400. After applying hash function 3 to file A's fingerprint 400 to generate a hash value of 6,007, the estimator tool 126 identifies the minimum value of hash function 3's hash values generated for file A is 42, which is the minimum value of one of hash function 3's hash values numbered 4 to 399. Having used hash function 3 to generate hash values for all of file A's 400 fingerprints, the estimator tool 126 identifies hash function 3's final minimum value of 42 as the MinHash value of hash function 3 for file A.

Similar to the application of hash functions 1, 2, and 3, the estimator tool 126 applies hash function 100 to file A's 400 fingerprints, including to file A's fingerprint 1 to generate a hash value of 13,259, to file A's fingerprint 2 to generate a hash value of 39,012, and to file A's fingerprint 3 to generate a hash value of 62,276. The estimator tool 126 continues applying hash function 100 to file A's fingerprints numbered 4 to 400 to generate hash function 100's hash values numbered 4 to 400. Although hash function 100's hash values numbered 4 to 399 for file A are not depicted, the hash values chart 200 does depict hash function 100's hash value 400 for file A, which is 48.

During the process of applying hash function 100 to file A's 400 fingerprints to generate hash function 100's 400 hash values, the size estimator 126 continuously tracks the minimum value of hash function 100's 400 hash values to determine file A's MinHash for hash function 100. For example, after applying hash function 100 to file A's fingerprint 1 to generate the hash value of 13,259, the estimator tool 126 identifies the minimum value of hash function 100's hash values generated for file A is 13,259. After applying hash function 100 to file A's fingerprint 2 to generate the hash value of 39,012, the estimator tool 126 identifies the minimum value of hash function 100's hash values generated for file A is still 13,259. After applying hash function 100 to file A's fingerprint 3 to generate the hash value of 62,276, the estimator tool 126 identifies the minimum value of hash function 100's hash values generated for file A is still 13,259.

The estimator tool 126 continues identifying the minimum value of hash function 100's hash values generated for file A while applying hash function 100 to file A's fingerprints numbered 4 to 400 to generate hash function 100's hash values numbered 4 to 400. After applying hash function 100 to file A's fingerprint 400 to generate the hash value of 48, the estimator tool 126 identifies the minimum value of hash function 100's hash values generated for file A is now 48. Having used hash function 100 to generate hash values for all of file A's 400 fingerprints, the estimator tool 126 identifies hash function 100's final minimum value of 48 as the MinHash value of hash function 100 for file A.

After applying hash functions 1 to 100 to file A's 400 fingerprints to identify 100 MinHash values for file A, the estimator tool 126 has effectively taken 100 random samples from file A's 400 fingerprints. This scaled-down version of 100 hash functions produces 100 samples with an expected error of 0.10, while the production environment's version of 1,024 hash functions produces 1,024 samples with an expected error of only 0.03. Having used any file's fingerprints to identify MinHash values for the file, the estimator tool 126 no longer needs to retain the file's fingerprints. The number of MinHash values for any file is independent of the number of the file's fingerprints, unlike the physical capacity reporting algorithm which requires its bloom filters to be proportional in size to the number of all data files' fingerprints in a data file's system.

In addition to applying hash functions 1 to 100 to file A's 400 fingerprints to identify 100 MinHash values for file A, the estimator tool 126 applies hash functions 1 to 100 to file B's 400 fingerprints to identify 100 MinHash values for file B, although the hash value chart 200 only depicts the hash values generated by hash functions 1, 2, 3, and 100. Similar to the application of hash functions 1, 2, 3, and 100 to file A's 400 fingerprints, the estimator tool 126 applies hash function 1 to file B's fingerprint 1 to generate the hash value of 38,490, to file B's fingerprint 2 to generate the hash value of 25,654, and to file B's fingerprint 3 to generate the hash value of 20,741. The estimator tool 126 continues applying hash function 1 to file B's fingerprints numbered 4 to 400 to generate hash function 1's hash values numbered 4 to 400. Although hash function 1's hash values numbered 4 to 399 for file B are not depicted, the hash values chart 200 does depict hash function 1's hash value 400, for file B which is 6,945.

During the process of applying hash function 1 to file B's 400 fingerprints to generate hash function 1's 400 hash values, the size estimator 126 continuously tracks the minimum value of hash function 1's 400 hash values to determine file B's MinHash for hash function 1. For example, after applying hash function 1 to file B's fingerprint 1 to generate the hash value of 38,490, the estimator tool 126 identifies the minimum value of hash function 1's hash values generated for file B is 38,490. After applying hash function 1 to file B's fingerprint 2 to generate the hash value of 25,654, the estimator tool 126 identifies the minimum value of hash function 1's hash values generated for file B is now 25,654 because the current hash value of 25,654 is less than the previous minimum hash value of 38,490. After applying hash function 1 to file B's fingerprint 3 to generate a hash value of 20,741, the estimator tool 126 identifies the minimum value of hash function 1's hash values generated for file B is now 20,741 because the current hash value of 20,741 is less than the previous minimum hash value of 25,654.

The estimator tool 126 continues identifying the minimum value of hash function 1's hash values generated for file B while applying hash function 1 to file B's fingerprints numbered 4 to 400 to generate hash function 1's hash values numbered 4 to 400. After applying hash function 1 to file B's fingerprint 400 to generate a hash value of 6,945, the estimator tool 126 identifies the minimum value of hash function 1's hash values generated for file B is 91, which is the minimum value of one of hash function 1's hash values numbered 4 to 399, and is less than the current hash value of 6,945. Having used hash function 1 to generate hash values for all of file B's 400 fingerprints, the estimator tool 126 identifies hash function 1's final minimum value of 91 as the MinHash value of hash function 1 for file B.

Similar to the application of hash function 1, the estimator tool 126 applies hash function 2 to file B's fingerprint 1 to generate a hash value of 62,927, to file B's fingerprint 2 to generate a hash value of 25,628, and to file B's fingerprint 3 to generate a hash value of 64,004. The estimator tool 126 continues applying hash function 2 to file B's fingerprints numbered 4 to 400 to generate hash function 2's hash values numbered 4 to 400. Although hash function 2's hash values numbered 4 to 399 for file B are not depicted, the hash values chart 200 does depict hash function 2's hash value 400 for file B, which is 5,438.

During the process of applying hash function 2 to file B's 400 fingerprints to generate hash function 2's 400 hash values, the size estimator 126 continuously tracks the minimum value of hash function 2's 400 hash values to determine file B's MinHash for hash function 2. For example, after applying hash function 2 to file B's fingerprint 1 to generate a hash value of 62,927, the estimator tool 126 identifies the minimum value of hash function 2's hash values generated for file B is 62,927. After applying hash function 2 to file B's fingerprint 2 to generate a hash value of 25,628, the estimator tool 126 identifies the minimum value of hash function 2's hash values generated for file B is now 25,628 because the current hash value of 25,628 is less than the previous minimum hash value of 62,927. After applying hash function 2 to file B's fingerprint 3 to generate a hash value of 64,004, the estimator tool 126 identifies the minimum value of hash function 2's hash values generated for file B is still 25,628 because the current hash value of 64,004 is not less than the previous minimum hash value of 25,628.

The estimator tool 126 continues identifying the minimum value of hash function 2's hash values generated for file B while applying hash function 2 to file B's fingerprints numbered 4 to 400 to generate hash function 2's hash values numbered 4 to 400. After applying hash function 2 to file B's fingerprint 400 to generate a hash value of 5,438, the estimator tool 126 identifies the minimum value of hash function 2's hash values generated for file B is 123, which is the value of one of hash function 2's hash value numbered 4 to 399. Having used hash function 2 to generate hash values for all of file B's 400 fingerprints, the estimator tool 126 identifies hash function 2's final minimum value of 123 as the MinHash value of hash function 2 for file B.

In addition to applying hash function 1 to file B's 400 fingerprints to generate hash function 1's 400 hash values, and applying hash function 2 to file B's 400 fingerprints to generate hash function 2's 400 hash values, the estimator tool 126 applies hash functions numbered 3 to 100 to file B's 400 fingerprints, although the hash value chart 200 only depicts the hash values generated by hash function 3 and hash function 100. Similar to the application of hash functions 1 and 2, the estimator tool 126 applies hash function 3 to file B's fingerprint 1 to generate a hash value of 64,400, to file B's fingerprint 2 to generate a hash value of 45,461, and to file B's fingerprint 3 to generate a hash value of 13,617. The estimator tool 126 continues applying hash function 3 to file B's fingerprints numbered 4 to 400 to generate hash function 3's hash values numbered 4 to 400. Although hash function 3's hash values numbered 4 to 399 for file B are not depicted, the hash values chart 200 does depict hash function 3's hash value 400 for file B, which is 3,743.

During the process of applying hash function 3 to file B's 400 fingerprints to generate hash function 3's 400 hash values, the size estimator 126 continuously tracks the minimum value of hash function 3's 400 hash values to determine file B's MinHash for hash function 3. For example, after applying hash function 3 to file B's fingerprint 1 to generate a hash value of 64,400, the estimator tool 126 identifies the minimum value of hash function 3's hash values generated for file B is 64,400. After applying hash function 3 to file B's fingerprint 2 to generate a hash value of 45,461, the estimator tool 126 identifies the minimum value of hash function 3's hash values generated for file B is now 45,461 because the current hash value of 45,461 is less than the previous minimum hash value of 64,400. After applying hash function 3 to file B's fingerprint 3 to generate a hash value of 13,617, the estimator tool 126 identifies the minimum value of hash function 3's hash values generated for file B is now 13,617 because the current hash value of 13.617 is less than the previous minimum hash value of 45,461.

The estimator tool 126 continues identifying the minimum value of hash function 3's hash values generated for file B while applying hash function 3 to file B's fingerprints numbered 4 to 400 to generate hash function 3's hash values numbered 4 to 400. After applying hash function 3 to file B's fingerprint 400 to generate a hash value of 3,743, the estimator tool 126 identifies the minimum value of hash function 3's hash values generated for file B is 57, which is the value of one of hash function 3's hash values numbered 4 to 399. Having used hash function 3 to generate hash values for all of file B's 400 fingerprints, the estimator tool 126 identifies hash function 3's final minimum value of 57 as the MinHash value of hash function 3 for file B.

Similar to the application of hash functions 1, 2, and 3, the estimator tool 126 applies hash function 100 to file B's fingerprint 1 to generate a hash value of 35,817, to file B's fingerprint 2 to generate a hash value of 51,336, and to file B's fingerprint 3 to generate a hash value of 58,767. The estimator tool 126 continues applying hash function 100 to file B's fingerprints numbered 4 to 400 to generate hash function 100's hash values numbered 4 to 400. Although hash function 100's hash values numbered 4 to 399 for file B are not depicted, the hash values chart 200 does depict hash function 100's hash value 400 for file B, which is 38,097.

During the process of applying hash function 100 to file B's 400 fingerprints to generate hash function 100's 400 hash values, the size estimator 126 continuously tracks the minimum value of hash function 100's 400 hash values to determine file B's MinHash for hash function 100. For example, after applying hash function 100 to file B's fingerprint 1 to generate a hash value of 35,817, the estimator tool 126 identifies the minimum value of hash function 100's hash values generated for file B is 35,817. After applying hash function 100 to file B's fingerprint 2 to generate a hash value of 51,336, the estimator tool 126 identifies the minimum value of hash function 100's hash values generated for file B is still 35,817 because the current hash value of 51,336 is not less than the previous minimum hash value of 35,817. After applying hash function 100 to file B's fingerprint 3 to generate a hash value of 58,767, the estimator tool 126 identifies the minimum value of hash function 100's hash values generated for file B is still 35,817 because the current hash value of 58,767 is not less than the previous minimum hash value of 35,817.

The estimator tool 126 continues identifying the minimum value of hash function 100's hash values generated for file B while applying hash function 100 to file B's fingerprints numbered 4 to 400 to generate hash function 100's hash values numbered 4 to 400. After applying hash function 100 to file B's fingerprint 400 to generate a hash value of 38,097, the estimator tool 126 identifies the minimum value of hash function 100's hash values generated for file B is 14, which is the value of one of hash function 100's hash values numbered 4 to 399. Having used hash function 100 to generate hash values for all of file B's 400 fingerprints, the estimator tool 126 identifies hash function 100's final minimum value of 14 as the MinHash value of hash function 100 for file B.

In addition to applying hash functions 1-100 to file A's 400 fingerprints to identify 100 MinHash values for file A, and applying hash functions 1-100 to file B's 400 fingerprints to identify 100 MinHash values for file B, the estimator tool 126 applies hash functions 1-100 to the 400 fingerprints for each of the files C—Z to identify 100 MinHash values for each of the files C-Z, although the hash value chart 200 depicts the hash values generated by applying hash functions 1, 2, 3, and 100 to files C and Z. After applying the same 100 hash functions to each file's fingerprints to identify 100 MinHash values for each file, the estimator tool 126 can compare any file's 100 MinHash values with any other file's 100 MinHash values to determine the size of the union of the two files, regardless of the number of fingerprints in either file. Although each of the scaled-down examples of 100 MinHash values are stored in two bytes that have the value range of 0 to 65,535, a production environment's MinHash values stored in eight bytes have the value range of 0 to $18*10^{18}$, which is sufficiently large to significantly reduce the probability of any one MinHash value being generated by applying the same hash function to two different fingerprints.

As an example of estimating the size of the union of files A and B, the estimator tool 126 determines that 60 of the 100 MinHash values generated for the 400 fingerprints for file A are the same as their corresponding 60 of the 100 MinHash values generated for the 400 fingerprints for file B, then estimating the Jaccard similarity coefficient as equal to 60 common MinHash values divided by 100 total MinHash functions which equals 0.6. The estimator tool 126 determines that the aggregated numbers of fingerprints for files A and B is equal to 400 total fingerprints for file A plus 400 total fingerprints for file B, which equals 800 total fingerprints, which represent 800 data segments. The estimator tool 126 adds the 4 MB size of file A to the 4 MB size of file B to total a maximum 8 MB size for the union of files A and B, and divides this 8 MB size by the 800 data segments to identify an average segment size of 10 KB. The estimator tool 126 divides the 800 total fingerprints by the sum of 1.0 plus the estimate of the Jaccard similarity coefficient of 0.6, which is 800 divided by (1.0+0.6), or 800 divided by 1.6, which equals an estimated 500 unique data segments for the union of files A and B. The estimator tool 126 multiplies the estimate of 500 unique data segments by the average size of 10 KB per segment to estimate a size of 5 MB for the union of files A and B.

After using the MinHash values of two data files to estimate the size of the union of the two data files, the estimator tool 126 identifies the MinHash values of the union of the two data files, which enables the estimator tool 126 to use the MinHash values of the union of the two data files to estimate the size of the union of any other data file with the union of the two data files. For example, after using the 100 MinHash values of file A and the 100 MinHash values of file B to estimate the size of the union of files A and B, the estimator tool 126 identifies the $1^{st}$ MinHash value of 91 for the union of files A and B from the $1^{st}$ MinHash value of 91 for file A and the $1^{st}$ MinHash value of 91 for file B, the $2^{nd}$ MinHash value of 123 for the union of files A and B from the $2^{nd}$ MinHash value of 139 for file A and the $2^{nd}$ MinHash value of 123 for file B, and the $3^{rd}$ MinHash value of 42 for the union of files A and B from the $3^{rd}$ MinHash value of 42 for file A and the $3^{rd}$ MinHash value of 57 for file B. Although not depicted by the chart 300, the estimator tool 126 continues by identifying the $4^{th}$ to the $99^{th}$ MinHash values for the union of files A and B from the $4^{th}$ to the $99^{th}$ MinHash values for file A and the $4^{th}$ to the $99^{th}$ MinHash values for file B. After the estimator tool 126 identifies the $100^{th}$ MinHash value of 123 for the union of files A and B from the $100^{th}$ MinHash value of 139 for file A and the $100^{th}$ MinHash value of 123 for file B, the MinHash values of the union of files A and B are prepared to be used in estimating the size of the union of any other data file, such as file C, with the union of files A and B.

Similar to the identification of the 100 MinHash values of hash functions 1-100 for file A, and the identification of the 100 MinHash values of hash functions 1-100 for file B, the estimator tool 126 identifies the 100 MinHash values of hash functions 1-100 for each of the other files C—Z, such as file C. For example, the estimator tool 126 identifies hash function 1's final minimum value of 146 as the MinHash value of hash function 1 for file C, after applying hash function 1 to generate hash function 1's hash values for all of file C's 400 fingerprints, which includes applying hash function 1 to file C's fingerprint 1 to generate the hash value of 33,813 and applying hash function 1 to file C's fingerprint 2 to generate the hash value of 50,992. The estimator tool 126 identifies hash function 2's final minimum value of 25 as the MinHash value of hash function 2 for file C, having applied hash function 2 to generate hash function 2's hash values for all of file C's 400 fingerprints, which includes applying hash function 2 to file C's fingerprint 1 to generate the hash value of 43,862 and applying hash function 2 to file C's fingerprint 2 to generate the hash value of 21,455.

The estimator tool 126 identifies hash function 3's final minimum value of 75 as the MinHash value of hash function 3 for file C, after applying hash function 3 to generate hash function 3's hash values for all of file C's 400 fingerprints, which includes applying hash function 3 to file C's fingerprint 1 to generate the hash value of 30,706 and applying hash function 3 to file C's fingerprint 2 to generate the hash value of 50,573, Although not depicted by the chart 300, the estimator tool 126 identifies hash functions 4-99's final minimum values as the MinHash values of hash functions 4-99 for file C, after applying hash functions 4-99 to generate hash functions 4-99's hash values for all of file C's 400 fingerprints, which includes applying hash functions 4-99 to file C's fingerprint 1 to generate the hash values 4-99 and applying hash functions 4-99 to file C's fingerprint 2 to generate the hash values 4-99. Then the estimator tool 126 identifies hash function 100's final minimum value of 48 as the MinHash value of hash function 100 for file C, after applying hash function 100 to generate hash function 100's hash values for all of file C's 400 fingerprints, which includes applying hash function 100 to file C's fingerprint 1 to generate the hash value of 18,838 and applying hash function 100 to file C's fingerprint 2 to generate the hash value of 58,661. After the estimator tool 126 identifies the 100 MinHash values of hash functions 1-100 for file C, the MinHash values of file C are prepared to be used in estimating the size of a union of with any other data file, such as a union with the union of files A and B.

For an example of estimating the size of a union of a file with an already existing union of files, the estimator tool 126 determines that 50 of the 100 MinHash values generated for the 500 fingerprints for the union of files A and B are the same as their corresponding 50 of the 100 MinHash values generated for the 400 fingerprints for file C, then estimating the Jaccard similarity coefficient as equal to 50 common MinHash values divided by 100 total MinHash functions which equals 0.5. The estimator tool 126 determines that the aggregated numbers of fingerprints for the union of files A and B and file C and B is equal to 500 total fingerprints for the union of files A and B plus 400 total fingerprints for file C, which equals 900 total fingerprints, which represent 900 data segments. The estimator tool 126 adds the 5 MB size of the union of files A and B to the 4 MB size of file C to total a maximum 9 MB size for the union of the union of files A and B and file C, and divides this 9 MB size by the 900 data segments to identify an average data segment size of 10 KB. The estimator tool 126 divides the 900 total fingerprints by the sum of 1.0 plus the estimate of the Jaccard similarity coefficient of 0.5, which is 900 divided by (1.0+0.5), or 900 divided by 1.5, which equals an estimated 600 unique data segments for the union of the union of files A and B and file C. The estimator tool 126 multiplies the estimate of 600 unique data segments by the average size of 10 KB per data segment to estimate a size of 6 MB for the union of the union of files A and B and file C.

Figure 3:
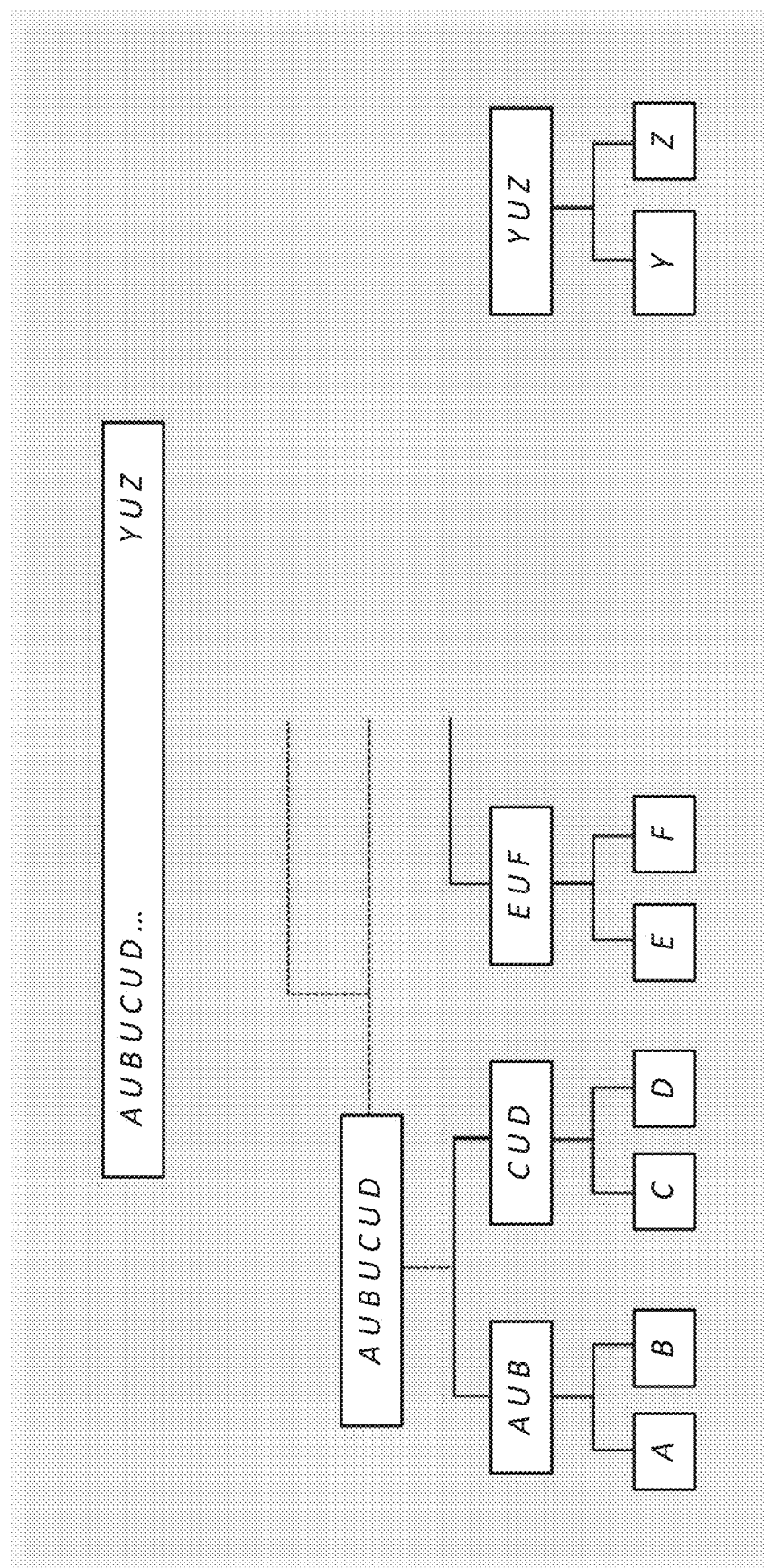
FIG. 3 illustrates an example file union diagram for estimating data file union sizes, under an embodiment.

FIG. 3 illustrates an example file union diagram 300 for estimating data file union sizes, under an embodiment. If there are 26 files, A, B, Z, estimator tool 126 may apply the MinHash algorithm to obtain the sizes of A U B, C U D, Y U Z, as depicted by the diagram 300. Then the MinHash algorithm can repeat the same procedure until the total size of all the files is obtained. The MinHash algorithm can use a simpler order, such as ((((A U B) U C) U D) Z) but the number of steps is the same, 25. However, the hierarchical order depicted by the diagram 300 may be preferred due to the of the estimation resolution. If the system 100 applies 100 hash functions to each data file to generate 100 MinHash values for each data file, then the smallest non-zero similarity that the estimator tool 126 can estimate between two groups of data files is 1 of 100 MinHash values, which is a 1 percent resolution. A 1 percent resolution may be small enough to accurately estimate the similarities between data file groups of similar-sizes, such as at the midpoint of the hierarchical ordering, after estimating the similarity between Y and Z, and before estimating the similarity between (A U B) and (C U D). However, a 1 percent resolution may not be small enough to accurately estimate the relatively small similarities between data file groups of different sizes, such as at the midpoint of the simple ordering, after estimating the similarity between a group of 13 files A-M and a group of the 14$^{th}$ file N, and before estimating the similarity between a group of 14 files A-N and a group of the 15$^{th}$ file, O.

Figure 4A:
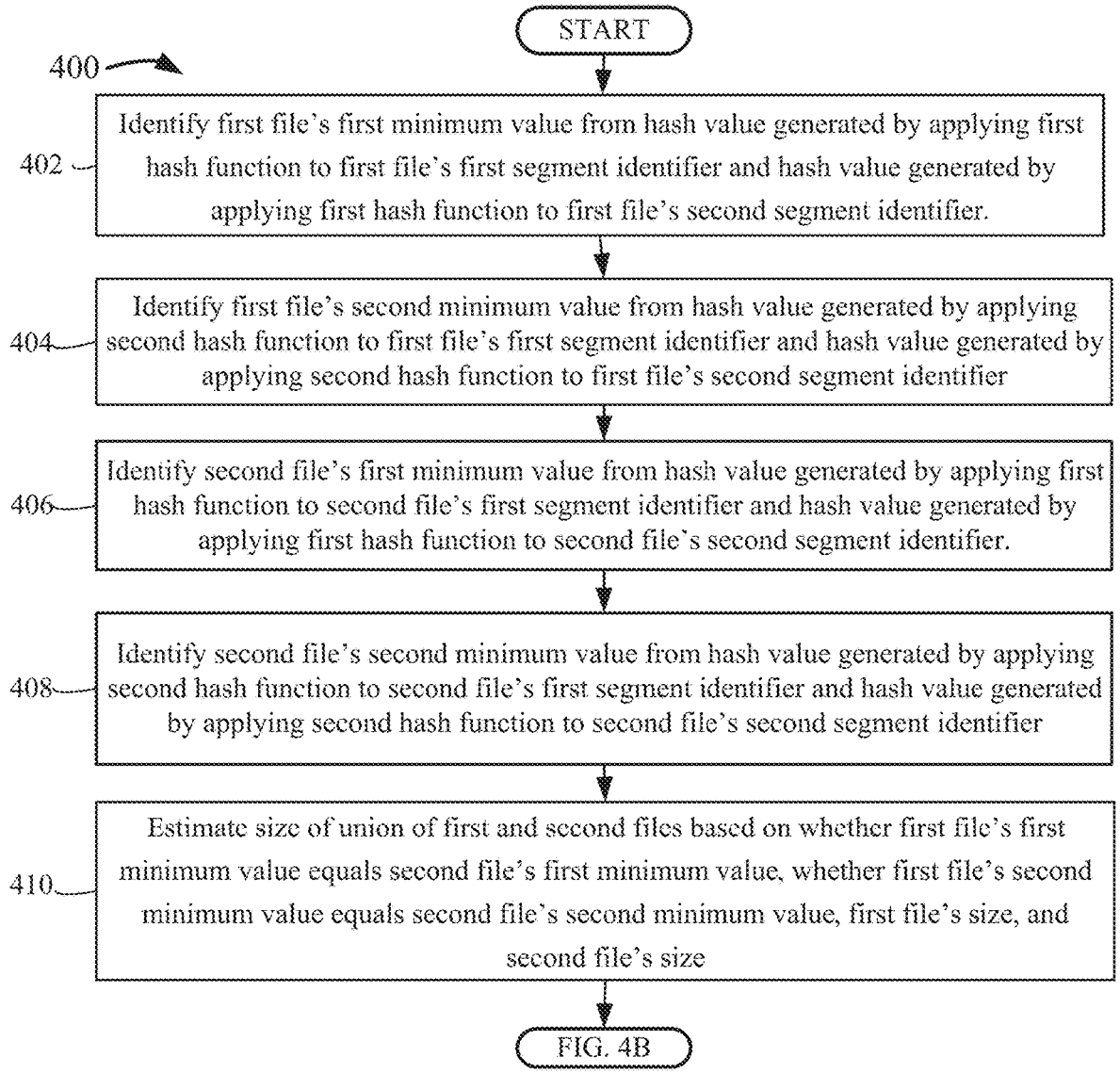
FIG. 4A and FIG. 4B are a flowchart that illustrates a method of estimating data file union sizes, under an embodiment.
Figure 4B:
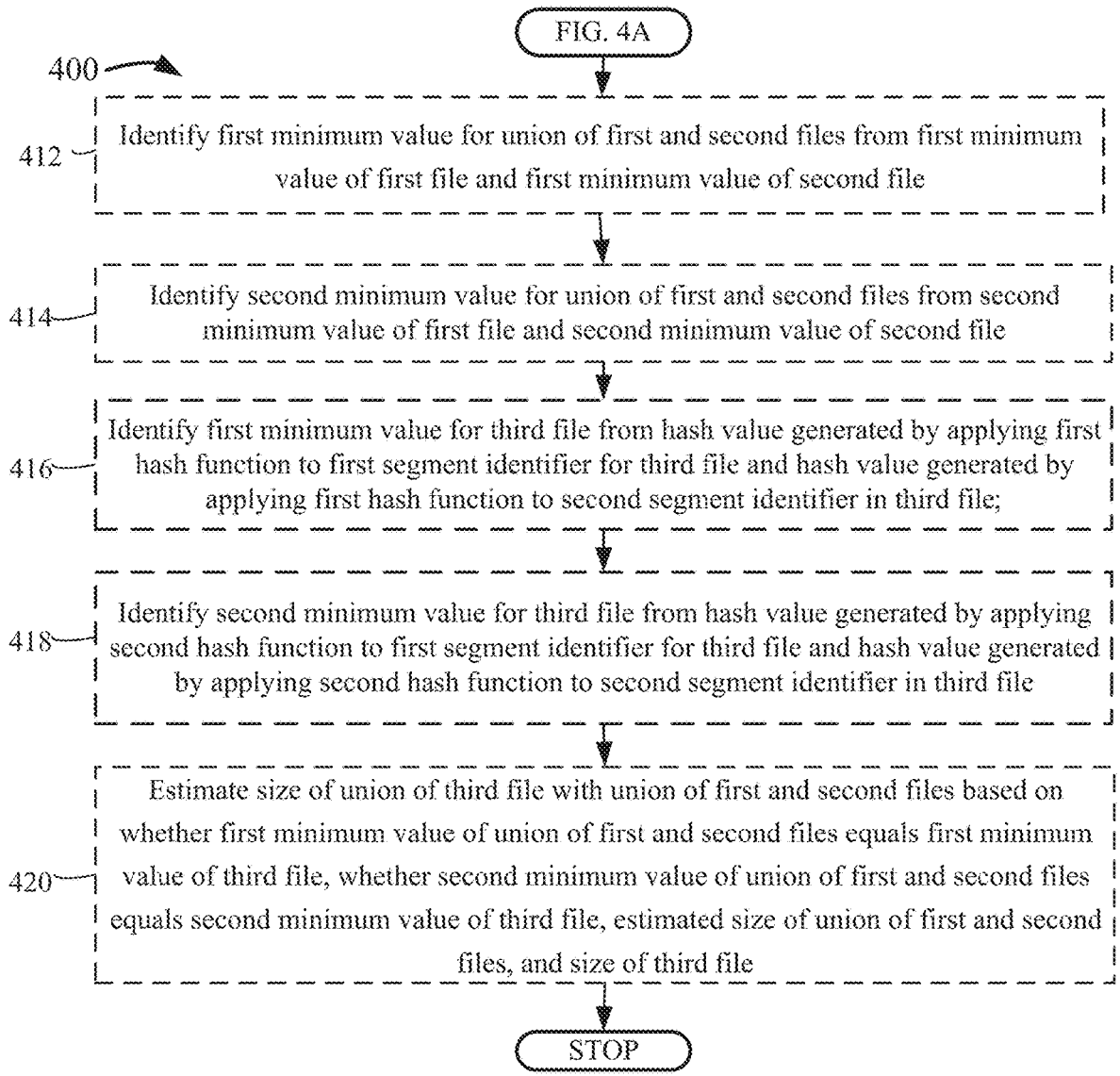

FIG. 4A-B is a flowchart that illustrates a method for estimating data file union sizes, under an embodiment. Flowchart 400 illustrates method acts illustrated as flowchart blocks for certain steps involved in the backup server 110, the clients 102-108, the storage array 112, and the cloud tier 114, and/or between the clients 102-108 and the backup server 110, the storage array 112, and the cloud tier 114 of FIG. 1.

An estimator tool identifies a first file's first minimum value from at least the hash value generated by applying a first hash function to the first file's first segment identifier and the hash value generated by applying the first hash function to the first file's second segment identifier, block 402. A system identifies the first MinHash value for the first file by applying the first hash function to the first file's fingerprints. For example, and without limitation, this can include the estimator tool 126 identifying hash function 1's final minimum value of 91 as the MinHash value of hash function 1 for file A, after applying hash function 1 to generate hash function 1's hash values for all of file A's 400 fingerprints, which includes applying hash function 1 to file A's fingerprint 1 to generate the hash value of 17,445 and applying hash function 1 to file A's fingerprint 2 to generate the hash value of 91, as depicted by the hash values chart 200.

A file can be a collection of data stored in a computer's memory or on a storage device under a single identifying name. A minimum value can be a smallest numerical amount for a specific purpose. A hash value can be an output returned by a function, and can also be called a hash code, a hash sum, or a hash. A hash function can be any relation between an input and an output that may be used to map data of arbitrary size to data of fixed size. A segment identifier can be a sequence of characters used to refer to a part into which a file is divided.

The first and second segment identifiers for the first file and the first and second segment identifiers for the second file may correspond to first, second, third, and fourth fingerprints generated by applying the same hash function to corresponding first and second segments in the first file and corresponding first and second segments in the second file. For example, the backup/restore application 124 applies the SHA-1 hash function to file A's data segment 1 and data segment 2 to generate file A's fingerprint 1 and fingerprint 2, and to file B's data segment 1 and data segment 2 to generate file B's fingerprint 1 and fingerprint 2. A fingerprint can be a bit string which was mapped from a larger data object or data file, and which uniquely identifies the larger data object or data file. A segment can be a part into which a file is divided.

In addition to identifying the first MinHash value for the first file, the estimator tool identifies the first file's second minimum value from at least the hash value generated by applying a second hash function to the first file's first segment identifier and the hash value generated by applying the second hash function to the first file's second segment identifier, block 404. The system identifies the second MinHash value for the first file by applying the second hash function to the first file's fingerprints. By way of example and without limitation, this can include the estimator tool 126 identifying hash function 2's final minimum value of 139 as the MinHash value of hash function 2 for file A, after applying hash function 2 to generate hash function 2's hash values for all of file A's 400 fingerprints, which includes applying hash function 2 to file A's fingerprint 1 to generate the hash value of 25,871 and applying hash function 2 to file A's fingerprint 2 to generate the hash value of 58,168, as depicted by the hash values chart 200.

As well as identifying MinHash values for the first file, the estimator tool identifies a second file's first minimum value from at least the hash value generated by applying the first hash function to the second file's first segment identifier and the hash value generated by applying the first hash function to the second file's second segment identifier, block 406. The system identifies the first MinHash value for the second file by applying the first hash function to the second file's fingerprints. In embodiments, this can include the estimator tool 126 identifying hash function 1's final minimum value of 91 as the MinHash value of hash function 1 for file B, after applying hash function 1 to generate hash function 1's hash values for all of file B's 400 fingerprints, which includes applying hash function 1 to file B's fingerprint 1 to generate the hash value of 38,490 and applying hash function 1 to file A's fingerprint 2 to generate the hash value of 25,654, as depicted by the hash values chart 200.

Additional to identifying the first MinHash value for the second file, the estimator tool identifies the second file's second minimum value from at least the hash value generated by applying the second hash function to the second file's first segment identifier and the hash value generated by applying the second hash function to the second file's second segment identifier, block 408. The system identifies the second MinHash value for the second file by applying the second hash function to the second file's fingerprints. For example, and without limitation, this can include the estimator tool 126 identifying hash function 2's final minimum value of 123 as the MinHash value of hash function 2 for file B, after applying hash function 2 to generate hash function 2's hash values for all of file B's 400 fingerprints, which includes applying hash function 2 to file B's fingerprint 1 to generate the hash value of 62,927 and applying hash function 2 to file B's fingerprint 2 to generate the hash value of 25,628, as depicted by the hash values chart 200.

After identifying MinHash values for the first and second files, the estimator tool estimates the size of the union of the first and second files based on whether the first file's first minimum value equals the second file's first minimum value, whether the first file's second minimum value equals the second file's second minimum value, the first file's size, and the second file's size, block 410. The system uses the first and second files' MinHash values to estimate the size of the union of the first and second files. Estimating the size of the union of the first and second files may include counting each corresponding pair of minimum values that are equal as the intersection count, counting each hash function as a baseline count, and identifying a mathematical relationship of the intersection count to the baseline count as a similarity measure between the first and second files. The size of the first file combined with the size of the second file may be the maximum union size, the total count of segments in the first file combined with the total count of segments in the second file may be a segments count, and a mathematical relationship of the maximum union size to the segments count may be the average segment size. Estimating the size of the union of the first and second files may include identifying a mathematical relationship of the maximum union size to a sum of one plus the similarity measure as the estimated count of unique segments for the first and second files, and the estimated size of the union of the first and second files is based on the estimated count of unique segments and the average segment size.

By way of example and without limitation, this can include the estimator tool 126 determining that 60 of the 100 MinHash values generated for the 400 fingerprints for file A are the same as their corresponding 60 of the 100 MinHash values generated for the 400 fingerprints for file B, then estimating the Jaccard similarity coefficient as equal to 60 common MinHash values divided by 100 total MinHash functions which equals 0.6. The estimator tool 126 determines that the aggregated numbers of fingerprints for files A and B is equal to 400 total fingerprints for file A plus 400 total fingerprints for file B, which equals 800 total fingerprints, which represent 800 data segments. The estimator tool 126 adds the 4 MB size of file A to the 4 MB size of file B to total a maximum 8 MB size for the union of files A and B, and divides this 8 MB size by the 800 data segments to identify an average segment size of 10 KB. The estimator tool 126 divides the 800 total fingerprints by the sum of 1.0 plus the estimate of the Jaccard similarity coefficient of 0.6, which is 800 divided by (1.0+0.6), or 800 divided by 1.6, which equals an estimated 500 unique data segments for the union of files A and B. The estimator tool 126 multiplies the estimate of 500 unique data segments by the average size of 10 KB per data segment to estimate a size of 5 MB for the union of files A and B.

A size can be a storage space magnitude. A union can be a collection of entities. An intersection count can be a total number of a collection of entities that are common to multiple collections of entities. A baseline count can be a total number of entities in a collection of entities combined with a total number of entities in another collection of entities.

A mathematical relationship can be how values are associated on a numerical basis. A similarity measure can be how much files or clusters of files resemble each other. A maximum union size can be a largest storage space magnitude for a collection of storage space magnitudes. A total count can be a complete number of a collection of entities. A segment count can be a total number of parts into which at least one file is divided. An average segment size can be a mean value of a storage space magnitude for parts into which a file is divided.

An estimated count can be an approximated total number of a collection of entities. A unique segment can be a part into which a file is divided which is distinctive of other parts into which the file or other files are divided. An estimated size can be an approximated storage space magnitude.

Following the estimating of the size of the union of the first and second files, the estimator tool optionally identifies the first minimum value for the union of the first and second files from the first minimum value of the first file and the first minimum value of the second file, block 412. The system can identify the first MinHash value for the union of the first and second files from the first MinHash value for the first file and the first MinHash value for the second file. For example, and without limitation, this can include the estimator tool 126 identifying the first MinHash value of 91 for the union of files A and B from the first MinHash value of 91 for file A and the first MinHash value of 91 for file B, as depicted by the hash values chart 200.

In addition to identifying the first minimum value for the union of the first and second files, the estimator tool optionally identifies the second minimum value for the union of the first and second files from the second minimum value of the first file and the second minimum value of the second file, block 414. The system can identify the second MinHash value for the union of the first and second files from the second MinHash value for the first file and the second MinHash value for the second file. For example, and without limitation, this can include the estimator tool 126 identifying the second MinHash value of 123 for the union of files A and B from the second MinHash value of 139 for file A and the second MinHash value of 123 for file B, as depicted by the hash values chart 200.

As well as identifying the first minimum value for the union of the first and second files, the estimator tool optionally identifies the first minimum value for a third file from at least the hash value generated by applying the first hash function to the first segment identifier for the third file and the hash value generated by applying the first hash function to the second segment identifier for the third file, block 416. The system identifies the first MinHash value for the third file by applying the first hash function to the third file's fingerprints. By way of example and without limitation, this can include the estimator tool 126 identifying hash function 1's final minimum value of 146 as the MinHash value of hash function 1 for file C, after applying hash function 1 to generate hash function 1's hash values for all of file C's 400 fingerprints, which includes applying hash function 1 to file C's fingerprint 1 to generate the hash value of 33,813 and applying hash function 1 to file C's fingerprint 2 to generate the hash value of 50,992, as depicted by the hash values chart 200.

Additional to identifying the first minimum value for the third file, the estimator tool optionally identifies the second minimum value for the third file from at least the hash value generated by applying the second hash function to the first segment identifier for the third file and the hash value generated by applying the second hash function to the second segment identifier for the third file, block 418. The system identifies the second MinHash value for the third file by applying the second hash function to the third file's fingerprints. In embodiments, this can include the estimator tool 126 identifying hash function 2's final minimum value of 25 as the MinHash value of hash function 2 for file C, having applied hash function 2 to generate hash function 2's hash values for all of file C's 400 fingerprints, which includes applying hash function 2 to file C's fingerprint 1 to generate the hash value of 43,862 and applying hash function 2 to file C's fingerprint 2 to generate the hash value of 21,455, as depicted by the hash values chart 200.

Following the identification of MinHash values for the third file and the union of first and second files, the estimator tool optionally estimates the size of the union of the third file with the union of the first and second files based on whether the first minimum value of the union of the first and second files equals the first minimum value of the third file, whether the second minimum value of the union of the first and second files equals the second minimum value of the third file, the estimated size of the union of the first and second files, and the size of the third file, block 420. The system uses the first and second files' MinHash values and the third file's MinHash values to estimate the size of the union of the third file with the union of first and second files. For example, and without limitation, this can include the estimator tool 126 determining that 50 of the 100 MinHash values generated for the 500 fingerprints for the union of files A and B are the same as their corresponding 50 of the 100 MinHash values generated for the 400 fingerprints for file C, then estimating the Jaccard similarity coefficient as equal to 50 common MinHash values divided by 100 total MinHash functions which equals 0.5. The estimator tool 126 determines that the aggregated numbers of fingerprints for the union of files A and B and file C is equal to 500 total fingerprints for the union of files A and B plus 400 total fingerprints for file C, which equals 900 total fingerprints, which represent 900 data segments.

The estimator tool 126 adds the 5 MB size of the union of files A and B to the 4 MB size of file C to total a maximum 9 MB size for the union of the union of files A and B and file C, and divides this 9 MB size by the 900 data segments to identify an average segment size of 10 KB. The estimator tool 126 divides the 900 total fingerprints by the sum of 1.0 plus the estimate of the Jaccard similarity coefficient of 0.5, which is 900 divided by (1.0+0.5), or 900 divided by 1.5, which equals an estimated 600 unique data segments for the union of the union of files A and B and file C. The estimator tool 126 multiplies the estimate of 600 unique data segments by the average size of 10 KB per segment to estimate a size of 6 MB for the union of the union of files A and B and file C.

The estimator tool 126 can apply a hierarchical clustering algorithm, which can identify similar subsets of data files, use each data file's MinHash values to estimate the similarity or distance between each cluster of data files at each step, and then combine the two most similar clusters of data files. At the k-th step of the hierarchical clustering algorithm, there are 26 data files, such as A, B, C, . . . Z, which have the MinHash values $M_A$, $M_B$, $M_C$, . . . $M_Z$, and the physical sizes |A|, |B|, |C|, . . . |Z| are known. The hierarchical clustering algorithm combines the two most similar clusters of files A and B to form a new cluster of files A ∪ B, and uses $M_A$ and $M_{B'}$ to directly compute the MinHash values $M_{A \cup B}$. The hierarchical clustering algorithm repeats the same procedure until all the clusters of data files are combined into one cluster of data files.

The union of the first and second files may be selected for creation based on a distance between the first and second files being identified as a minimum distance of distances between files, and the distance between the first and second files being based on whether the first minimum value of the first file equals the first minimum value of the second file, and whether the second minimum value of the first file equals the second minimum value of the second file. For example, the estimator tool 126 initially applied hash functions 1-100 to the 400 fingerprints for the 400 data segments for each of the data files A-Z to generate 100 MinHash values for each of the data files A-Z. The estimator tool 126 continued the initialization process by using the 100 MinHash values for each of the data files A-Z to estimate the distances between each of the data files A-Z Then the estimator tool 126 compared the estimated distances between each of the data files A-Z, and determined that the shortest of the estimated distances was the distance between file A and file B. Consequently, in the previous examples of estimating the size of the union of files A and B may have been based on the estimator tool 126 clustering file A with file B based on using the 100 MinHash values as an estimate of the distance between file A and file B.

Continuing the premise of this current example, after clustering file A with file B, the estimator tool 126 estimated the distances between each of the union of files A and B and the files C-Z Then the estimator tool 126 compared the estimated distances between each of the union of files A and B and the files C-Z, and determined that the shortest of the estimated distances was the distance between the union of files A and B and the file C. Consequently, in the previous examples of estimating the size of the union of the file C with the union of files A and B may have been based on the estimator tool 126 clustering file C with the cluster of files A and B based on using the 100 MinHash values for each file or cluster of files as an estimate of the distance between file C and the cluster of files A and B. The estimator tool 126 uses the Jaccard index to identify which two cluster of data files are separated by the shortest distance, combines the identified clusters, generates the MinHash values for the newly combined cluster, estimates the size of the newly combined cluster, and uses this clustering algorithm to iteratively create clusters of data files based on the shortest distance between each of the cluster of files. The MinHash algorithm is the most efficient solution to the hierarchical clustering problem because the MinHash algorithm uses the most compact data structure not only to estimate the size of the union of each cluster of data files, but also to estimate the similarities between each cluster of data files, and use the efficiently estimated similarities to identify which clusters to combine and when to combine these identified clusters.

A distance can be a measured separation between entities. A count can be a total number of a collection of entities. A minimum distance can be a smallest of measured separations between entities for a specific purpose. A count can be a total number of a collection of entities.

Although FIG. 4A-B depicts the blocks 402-420 occurring in a specific order, the blocks 402-420 may occur in another order. In other implementations, each of the blocks 402-420 may also be executed in combination with other blocks and/or some blocks may be divided into a different set of blocks.

Figure 5:
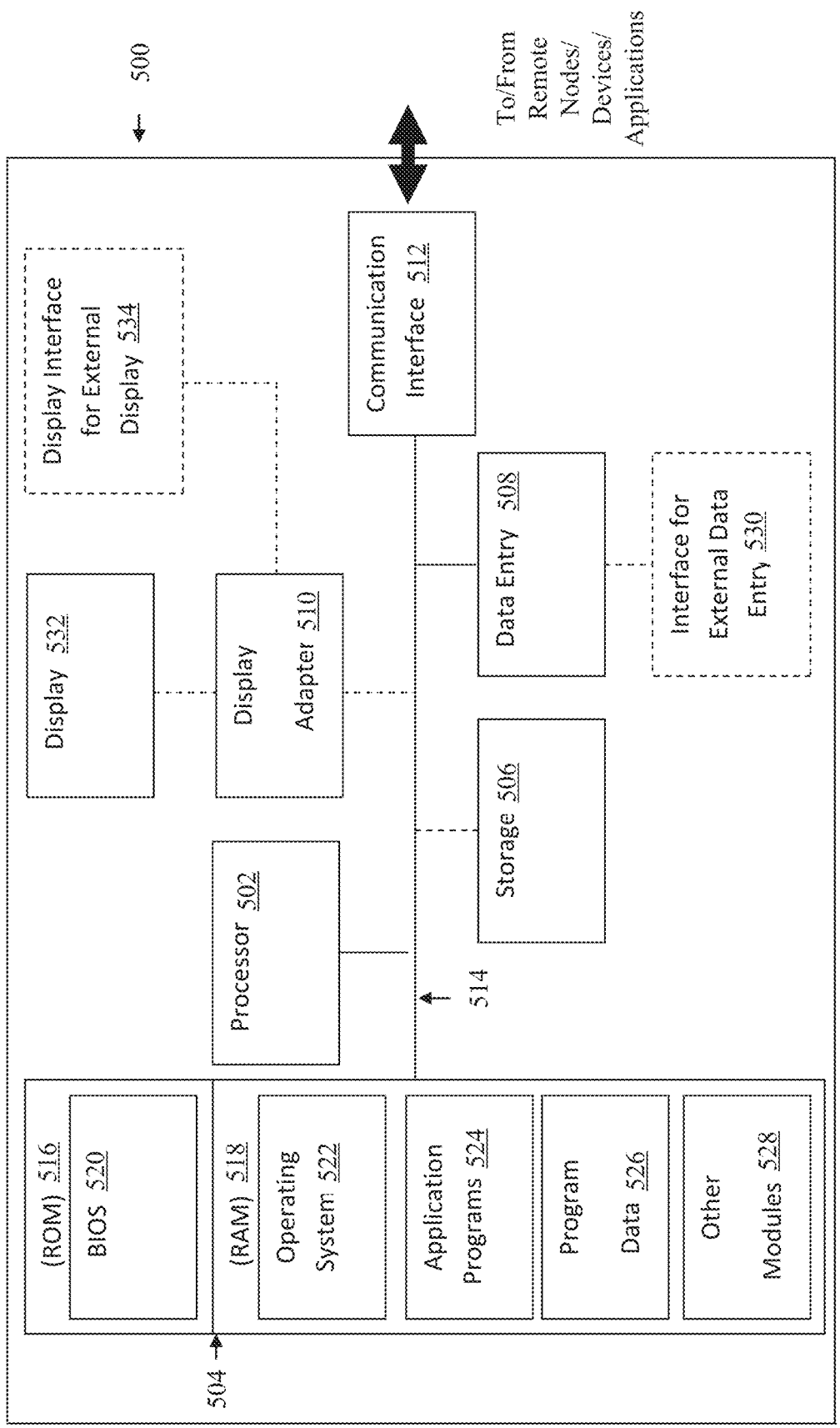
FIG. 5 is a block diagram illustrating an example hardware device in which the subject matter may be implemented.

Having described the subject matter in detail, an exemplary hardware device in which the subject matter may be implemented shall be described. Those of ordinary skill in the art will appreciate that the elements illustrated in FIG. 5 may vary depending on the system implementation. With reference to FIG. 5, an exemplary system for implementing the subject matter disclosed herein includes a hardware device 500, including a processing unit 502, memory 504, storage 506, a data entry module 508, a display adapter 510, a communication interface 512, and a bus 514 that couples the elements 504-512 to the processing unit 502.

The bus 514 may comprise any type of bus architecture. Examples include a memory bus, a peripheral bus, a local bus, etc. The processing unit 502 is an instruction execution machine, apparatus, or device and may comprise a microprocessor, a digital signal processor, a graphics processing unit, an application specific integrated circuit (ASIC), a field programmable gate array (FPGA), etc. The processing unit 502 may be configured to execute program instructions stored in the memory 504 and/or the storage 506 and/or received via the data entry module 508.

The memory 504 may include read only memory (ROM) 516 and random-access memory (RAM) 518. The memory 504 may be configured to store program instructions and data during operation of the hardware device 500. In various embodiments, the memory 504 may include any of a variety of memory technologies such as static random-access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. The memory 504 may also include nonvolatile memory technologies such as nonvolatile flash RAM (NVRAM) or ROM. In some embodiments, it is contemplated that the memory 504 may include a combination of technologies such as the foregoing, as well as other technologies not specifically mentioned. When the subject matter is implemented in a computer system, a basic input/output system (BIOS) 520, containing the basic routines that help to transfer information between elements within the computer system, such as during start-up, is stored in the ROM 516.

The storage 506 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD, or other optical media. The drives and their associated computer-readable media provide nonvolatile storage of computer readable instructions, data structures, program modules and other data for the hardware device 500.

It is noted that the methods described herein may be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high-definition DVD (HD-DVD™), a BLU-RAY disc; and the like.

A number of program modules may be stored on the storage 506, the ROM 516 or the RAM 518, including an operating system 522, one or more applications programs 524, program data 526, and other program modules 528. A user may enter commands and information into the hardware device 500 through the data entry module 508. The data entry module 508 may include mechanisms such as a keyboard, a touch screen, a pointing device, etc. Other external input devices (not shown) are connected to the hardware device 500 via an external data entry interface 530.

By way of example and not limitation, external input devices may include a microphone, joystick, game pad, satellite dish, scanner, or the like. In some embodiments, external input devices may include video or audio input devices such as a video camera, a still camera, etc. The data entry module 508 may be configured to receive input from one or more users of the hardware device 500 and to deliver such input to the processing unit 502 and/or the memory 504 via the bus 514.

A display 532 is also connected to the bus 514 via the display adapter 510. The display 532 may be configured to display output of the hardware device 500 to one or more users. In some embodiments, a given device such as a touch screen, for example, may function as both the data entry module 508 and the display 532. External display devices may also be connected to the bus 514 via an external display interface 525,654. Other peripheral output devices, not shown, such as speakers and printers, may be connected to the hardware device 500.

The hardware device 500 may operate in a networked environment using logical connections to one or more remote nodes (not shown) via the communication interface 512. The remote node may be another computer, a server, a router, a peer device, or other common network node, and typically includes many or all the elements described above relative to the hardware device 500. The communication interface 512 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network).

Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, the communication interface 512 may include logic configured to support direct memory access (DMA) transfers between the memory 504 and other devices.

In a networked environment, program modules depicted relative to the hardware device 500, or portions thereof, may be stored in a remote storage device, such as, for example, on a server. It will be appreciated that other hardware and/or software to establish a communications link between the hardware device 500 and other devices may be used.

The arrangement of the hardware device 500 illustrated in FIG. 5 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) may be realized, in whole or in part, by at least some of the components illustrated in the arrangement of the hardware device 500.

In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 5.

Other components may be implemented in software, hardware, or a combination of software and hardware.

Moreover, some or all these other components may be combined, some may be omitted altogether, and additional components may be added while still achieving the functionality described herein. Thus, the subject matter described herein may be embodied in many different variations, and all such variations are contemplated to be within the scope of what is claimed.

In the description herein, the subject matter is described with reference to acts and symbolic representations of operations that are performed by one or more devices, unless indicated otherwise. As such, it is understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have properties defined by the format of the data. However, while the subject matter is described in this context, it is not meant to be limiting as those of skill in the art will appreciate that various of the acts and operations described herein may also be implemented in hardware.

To facilitate an understanding of the subject matter described, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation to encompass all such modifications and similar arrangements.

What is claimed is:

1. A system for estimating data file union sizes, comprising:
    one or more processors; and
    a non-transitory computer readable medium storing a plurality of instructions, which when executed, cause the one or more processors to:
    receive a first file to identify a first minimum value for a first file from at least a hash value generated by applying a first hash function to a first fingerprint for the first file and a hash value generated by applying the first hash function to a second fingerprint for the first file;
    receive a second file to identify a second minimum value for the first file from at least a hash value generated by applying a second hash function to the first fingerprint for the first file and a hash value generated by applying the second hash function to the second fingerprint for the first file;
    identify a first minimum value for a second file from at least a hash value generated by applying the first hash function to a first fingerprint for the second file and a hash value generated by applying the first hash function to a second fingerprint for the second file;
    identify a second minimum value for the second file from at least a hash value generated by applying the second hash function to the first fingerprint for the second file and a hash value generated by applying the second hash function to the second fingerprint for the second file;
    determine, prior to deduplication of the first file and the second file, wherein the deduplication includes transmission of deduplicated backup and sends only changed data blocks, whether an amount of recording media of a data storage is sufficient for storing the first file and the second file by estimating a total size of unique data segments from the first file and second file, which comprises estimating a size of a union of the first file and the second file based on whether each minimum value of each hash function for the first file equals a corresponding minimum value of each corresponding hash function for the second file, counting each corresponding pair of minimum values of each hash function that are equal as an intersection count, for any total count of either data segments or fingerprints for the first and second files, counting each hash function as a baseline count, and identifying a mathematical relationship of the intersection count to the baseline count as a similarity measure between the first and second files, wherein the intersection count includes a total number of a collection of entities that are common to multiple collections of entities and the similarity measure includes how much files or clusters of files resemble each other.

2. The system of claim 1, wherein the first and second fingerprints for the first file and the first and second fingerprints for the second file correspond to first, second, third, and fourth fingerprints generated by applying a same hash function to corresponding first and second segments in the first file and corresponding first and second segments in the second file.

3. The system of claim 1, wherein the size of the first file combined with the size of the second file comprises a maximum union size, a total count of segments in the first file combined with a total count of segments in the second file comprises a segments count, and a mathematical relationship of the maximum union size to the segments count comprises an average segment size.

4. The system of claim 3, wherein estimating the size of the union of the first and second files comprises identifying a mathematical relationship of the maximum union size to a sum of one plus the similarity measure as an estimated count of unique segments for the first and second files, and an estimated size of the union of the first and second files is based on the estimated count of unique segments and the average segment size.

5. The system of claim 1, wherein the plurality of instructions further causes the processor to:
    identify a first minimum value for the union of the first and second files from the first minimum value of the first file and the first minimum value of the second file;
    identify a second minimum value for the union of the first and second files from the second minimum value of the first file and the second minimum value of the second file;
    identify a first minimum value for a third file from at least a hash value generated by applying the first hash function to a first fingerprint for the third file and a hash value generated by applying the first hash function to a second fingerprint for the third file;

identify a second minimum value for the third file from at least a hash value generated by applying the second hash function to the first fingerprint for the third file and a hash value generated by applying the second hash function to the second fingerprint for the third file; and estimate a size of a union of the third file with the union of the first and second files based on whether the first minimum value of the union of the first and second files equals the first minimum value of the third file, whether the second minimum value of the union of the first and second files equals the second minimum value of the third file, the estimated size of the union of the first and second files, and a size of the third file.

6. The system of claim 1, wherein the union of the first and second files is selected for creation based on a distance between the first and second files being identified as a minimum distance of a plurality of distances between a plurality of files, and the distance between the first and second files being based on whether the first minimum value of the first file equals the first minimum value of the second file, and whether the second minimum value of the first file equals the second minimum value of the second file.

7. A computer-implemented method for estimating data file union sizes, the computer-implemented method comprising:

receiving a first file to identify a first minimum value for a first file from at least a hash value generated by applying a first hash function to a first fingerprint for the first file and a hash value generated by applying the first hash function to a second fingerprint for the first file;

receiving a second file to identify a second minimum value for the first file from at least a hash value generated by applying a second hash function to the first fingerprint for the first file and a hash value generated by applying the second hash function to the second fingerprint for the first file;

identifying a first minimum value for a second file from at least a hash value generated by applying the first hash function to a first fingerprint for the second file and a hash value generated by applying the first hash function to a second fingerprint for the second file;

identifying a second minimum value for the second file from at least a hash value generated by applying the second hash function to the first fingerprint for the second file and a hash value generated by applying the second hash function to the second fingerprint for the second file;

determining, prior to deduplication of the first file and the second file, wherein the deduplication includes transmission of deduplicated backup and sends only changed data blocks, whether an amount of recording media of a data storage is sufficient for storing the first file and the second file by estimating a total size of unique data segments from the first file and second file, which comprises estimating a size of a union of the first file and the second file based on whether each minimum value of each hash function for the first file equals a corresponding minimum value of each corresponding hash function for the second file, counting each corresponding pair of minimum values of each hash function that are equal as an intersection count, for any total count of either data segments or fingerprints for the first and second files, counting each hash function as a baseline count, and identifying a mathematical relationship of the intersection count to the baseline count as a similarity measure between the first and second files, wherein the intersection count includes a total number of a collection of entities that are common to multiple collections of entities and the similarity measure includes how much files or clusters of files resemble each other.

8. The computer-implemented method of claim 7, wherein the first and second fingerprints for the first file and the first and second fingerprints for the second file correspond to first, second, third, and fourth fingerprints generated by applying a same hash function to corresponding first and second segments in the first file and corresponding first and second segments in the second file.

9. The computer-implemented method of claim 7, wherein the size of the first file combined with the size of the second file comprises a maximum union size, a total count of segments in the first file combined with a total count of segments in the second file comprises a segments count, and a mathematical relationship of the maximum union size to the segments count comprises an average segment size.

10. The computer-implemented method of claim 9, wherein estimating the size of the union of the first and second files comprises identifying a mathematical relationship of the maximum union size to a sum of one plus the similarity measure as an estimated count of unique segments for the first and second files, and an estimated size of the union of the first and second files is based on the estimated count of unique segments and the average segment size.

11. The computer-implemented method of claim 7, wherein the computer-implemented method further comprises:

identifying a first minimum value for the union of the first and second files from the first minimum value of the first file and the first minimum value of the second file;

identifying a second minimum value for the union of the first and second files from the second minimum value of the first file and the second minimum value of the second file;

identifying a first minimum value for a third file from at least a hash value generated by applying the first hash function to a first fingerprint for the third file and a hash value generated by applying the first hash function to a second fingerprint for the third file;

identifying a second minimum value for the third file from at least a hash value generated by applying the second hash function to the first fingerprint for the third file and a hash value generated by applying the second hash function to the second fingerprint for the third file; and estimating a size of a union of the third file with the union of the first and second files based on whether the first minimum value of the union of the first and second files equals the first minimum value of the third file, whether the second minimum value of the union of the first and second files equals the second minimum value of the third file, the estimated size of the union of the first and second files, and a size of the third file.

12. The computer-implemented method of claim 7, wherein the union of the first and second files is selected for creation based on a distance between the first and second files being identified as a minimum distance of a plurality of distances between a plurality of files, and the distance between the first and second files being based on whether the first minimum value of the first file equals the first minimum value of the second file, whether the second minimum value of the first file equals the second minimum value of the second file.

13. A computer program product, comprising a non-transitory computer-readable medium having a computer-readable program code embodied therein to be executed by one or more processors, the program code including instructions to:
- receive a first file to identify a first minimum value for a first file from at least a hash value generated by applying a first hash function to a first fingerprint for the first file and a hash value generated by applying the first hash function to a second fingerprint for the first file;
- receive a second file to identify a second minimum value for the first file from at least a hash value generated by applying a second hash function to the first fingerprint for the first file and a hash value generated by applying the second hash function to the second fingerprint for the first file;
- identify a first minimum value for a second file from at least a hash value generated by applying the first hash function to a first fingerprint for the second file and a hash value generated by applying the first hash function to a second fingerprint for the second file;
- identify a second minimum value for the second file from at least a hash value generated by applying the second hash function to the first fingerprint for the second file and a hash value generated by applying the second hash function to the second fingerprint for the second file;
- determine, prior to deduplication of the first file and the second file, wherein the deduplication includes transmission of deduplicated backup and sends only changed data blocks, whether an amount of recording media of a data storage is sufficient for storing the first file and the second file by estimating a total size of unique data segments from the first file and second file, which comprises estimating a size of a union of the first file and the second file based on whether each minimum value of each hash function for the first file equals a corresponding minimum value of each corresponding hash function for the second file, counting each corresponding pair of minimum values of each hash function that are equal as an intersection count, for any total count of either data segments or fingerprints for the first and second files, counting each hash function as a baseline count, and identifying a mathematical relationship of the intersection count to the baseline count as a similarity measure between the first and second files, wherein the intersection count includes a total number of a collection of entities that are common to multiple collections of entities and the similarity measure includes how much files or clusters of files resemble each other.

14. The computer program product of claim 13, wherein the first and second fingerprints for the first file and the first and second fingerprints for the second file correspond to first, second, third, and fourth fingerprints generated by applying a same hash function to corresponding first and second segments in the first file and corresponding first and second segments in the second file.

15. The computer program product of claim 13, wherein the size of the first file combined with the size of the second file comprises a maximum union size, a total count of segments in the first file combined with a total count of segments in the second file comprises a segments count, and a mathematical relationship of the maximum union size to the segments count comprises an average segment size, wherein estimating the size of the union of the first and second files comprises identifying a mathematical relationship of the maximum union size to a sum of one plus the similarity measure as an estimated count of unique segments for the first and second files, and an estimated size of the union of the first and second files is based on the estimated count of unique segments and the average segment size.

16. The computer program product of claim 13, wherein the program code includes further instructions to:
- identify a first minimum value for the union of the first and second files from the first minimum value of the first file and the first minimum value of the second file;
- identify a second minimum value for the union of the first and second files from the second minimum value of the first file and the second minimum value of the second file;
- identify a first minimum value for a third file from at least a hash value generated by applying the first hash function to a first fingerprint for the third file and a hash value generated by applying the first hash function to a second fingerprint for the third file;
- identify a second minimum value for the third file from at least a hash value generated by applying the second hash function to the first fingerprint for the third file and a hash value generated by applying the second hash function to the second fingerprint for the third file; and
- estimate a size of a union of the third file with the union of the first and second files based on whether the first minimum value of the union of the first and second files equals the first minimum value of the third file, whether the second minimum value of the union of the first and second files equals the second minimum value of the third file, the estimated size of the union of the first and second files, and a size of the third file.

17. The computer program product of claim 13, wherein the union of the first and second files is selected for creation based on a distance between the first and second files being identified as a minimum distance of a plurality of distances between a plurality of files, and the distance between the first and second files being based on whether the first minimum value of the first file equals the first minimum value of the second file, and whether the second minimum value of the first file equals the second minimum value of the second file.

* * * * *